(12) United States Patent
Lockett

(10) Patent No.: US 6,988,482 B2
(45) Date of Patent: Jan. 24, 2006

(54) DUAL ROTOR INTERNAL COMBUSTION ENGINE

(76) Inventor: Neal Lockett, P.O. Box 1006, Roslyn, WA (US) 98941

( * ) Notice: Subject to any disclaimer, the term of this patent is extended or adjusted under 35 U.S.C. 154(b) by 0 days.

(21) Appl. No.: 10/723,845

(22) Filed: Nov. 26, 2003

(65) Prior Publication Data

US 2005/0109309 A1    May 26, 2005

(51) Int. Cl.
*F01C 1/18*    (2006.01)
*F01C 19/10*   (2006.01)
*F01C 21/00*   (2006.01)
*F02B 53/00*   (2006.01)
*F02B 53/06*   (2006.01)

(52) U.S. Cl. ........ 123/202; 123/204; 123/212; 123/218; 123/241; 123/242; 123/44 D; 123/232; 123/244; 123/245; 123/249; 123/238; 123/246; 418/206.1; 418/206.5

(58) Field of Classification Search .......... 123/44 D, 123/202, 204, 212, 213, 218, 228, 232, 238, 123/241, 242, 244, 245, 246, 249; 418/206.1, 418/206.5
See application file for complete search history.

(56) References Cited

U.S. PATENT DOCUMENTS

| | | | |
|---|---|---|---|
| 3,115,124 A | | 12/1963 | Huthmacher |
| 3,538,893 A | * | 11/1970 | Tinsley ............ 123/246 |
| 3,724,427 A | | 4/1973 | Sauder |
| 3,777,723 A | | 12/1973 | Lundström et al. |
| 4,003,349 A | | 1/1977 | v. Habsburg-Lothringen |
| 4,005,955 A | | 2/1977 | Pamlin |
| 4,182,301 A | | 1/1980 | Dean |
| 4,633,829 A | * | 1/1987 | Kollen ............ 123/246 |

FOREIGN PATENT DOCUMENTS

| | | | |
|---|---|---|---|
| DE | 231015 | * | 3/1909 |
| DE | 231747 | * | 3/1924 |

* cited by examiner

*Primary Examiner*—Sheldon J Richter
(74) *Attorney, Agent, or Firm*—Christensen O'Connor Johnson Kindness PLLC

(57) ABSTRACT

An engine including a housing formed with a pair of side-by-side intersecting substantially cylindrical cavities, and a pair of counter-rotating power rotors rotatably mounted within the cavities. The pair of power rotors include intermeshing lobes that each define open ended combustion chambers.

40 Claims, 12 Drawing Sheets

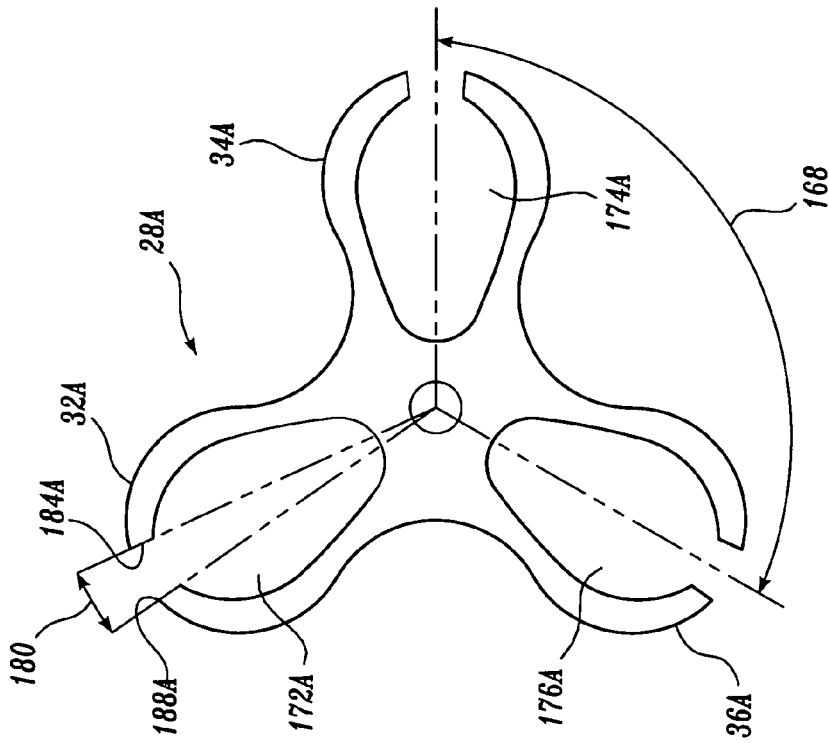
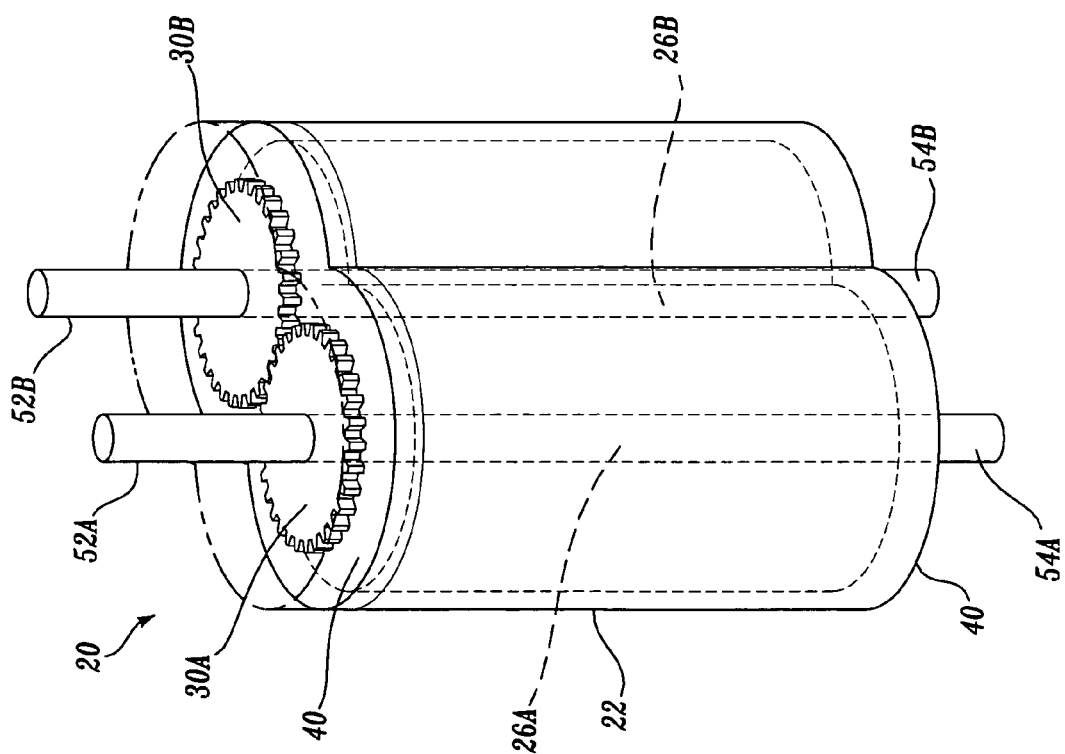

DUAL ROTOR INTERNAL COMBUSTION ENGINE

FIELD OF THE INVENTION

The present invention relates generally to internal combustion engines, and more particularly, to dual rotor internal combustion engines.

BACKGROUND OF THE INVENTION

Internal combustion engines have been around for many years for converting the energy of combusted gases into mechanical work in the form of a rotating crankshaft. One type of internal combustion engine known in the art is the reciprocating piston internal combustion engine. The conventional reciprocating piston internal combustion engine typically includes a housing, generally referred to as a block, that defines a plurality of cylinders arranged either in an in-line, V-type, or boxer configuration. Journaled at the lower end of the cylinders is a crankshaft. Each cylinder houses a piston reciprocally driven by the crankshaft via respective connecting rods. The cylinders and the pistons cooperate to form working chambers for the induction, compression, combustion, and exhaustion of air/fuel mixtures. The engine further includes pairs of camshafts, which are operatively connected to the crankshaft through a chain drive or other transmission so that they are driven to rotate in synchronization with the rotation of the crankshaft.

The top of each cylinder includes intake ports and exhaust ports. The intake and exhaust ports are opened and closed via respective valves. The valves are reciprocally mounted within the housing and are actuated via camshafts. The camshafts are operably connected to each valve via rocker arms pivotally mounted within cylinder heads mounted to the engine block. The valves are normally biased via springs to seal the intake and exhaust ports in a closed position. The springs are also operable to keep constant engagement between the top of each valve and a pivoting portion of the respective rocker arm.

While this particular configuration of an internal combustion engine works reasonably well to convert the energy of combusted gas into rotational mechanical work, it has many deficiencies due to its inherent design. First, these engines typically need to have large displacements to produce a desired amount of work. This typically requires the physical dimensions of the engine block to be quite large which causes problems in space sensitive applications. Additionally, based on the offset angle of the connecting rods, and the configuration of the crankshaft, cams, and springs, the reciprocating piston engine is not very efficient in converting reciprocating motion of the pistons into crankshaft rotation. Further, these engines require an exorbitant amount of parts, which increases costs, and decreases reliability.

SUMMARY OF THE INVENTION

In accordance with aspects of the present invention, an engine is provided that comprises a housing including a pair of end walls and a pair of intersecting parallel cylinder walls having inner wall surfaces that define first and second interconnected cylindrical cavities. The intersecting cylinder walls form spaced-apart parallel first and second edges. The engine also includes first and second shafts that extend coaxially into the cavities and are supported for rotation at the end walls. The engine further includes first and second rotors secured to said first and second shafts for rotation in the respective cavities. The first and second rotors each have a plurality of radially extending lobes with outer ends. Each lobe defines a combustion chamber that opens at the lobe outer end.

In accordance with another aspect of the present invention, an engine is provided that includes a housing formed with a pair of side-by-side intersecting substantially cylindrical cavities and a pair of counter-rotating power rotors rotatably mounted in the cavities. The pair of power rotors include intermeshing lobes that each define open ended combustion chambers. The engine also includes at least two exhaust ports formed in the housing in fluid communication with the pair of cavities and an ignition device in communication with the cavities. The engine further includes first and second fuel intake ports disposed in the housing and connected in fluid communication with the cavities and first and second air intake ports disposed in the housing and connected in fluid communication with the cavities.

In accordance with still another embodiment of the present invention, an engine is provided that comprises a housing defining parallel cylindrically shaped intersecting cavities and a pair of parallel shafts rotatably mounted within the cavities. The pair of parallel shafts extend outside the housing to form at least one drive shaft. The engine further includes first and second intermeshing rotors rotatably mounted within the housing. Each rotor is configured with a central hub portion coupled to one of the shafts for rotation therewith and a number of radially outward extending lobes defining open ended combustion chambers.

In accordance with yet another aspect of the present invention, an engine is provided that includes a housing formed with a pair of side-by-side intersecting substantially cylindrical cavities and a pair of counter-rotating power rotors rotatably mounted in the cavities. The pair of power rotors includes intermeshing lobes that each define open ended combustion chambers. The engine also includes first and second intake ports formed in the housing and connected in fluid communication with the cavities and a source of air for injecting air to each combustion chamber, and third and fourth intake ports formed in the housing and connected in fluid communication with the cavities and a source of fuel for injecting fuel into each air filled combustion chamber to form an air/fuel mixture. The engine further includes an ignition device coupled to the housing and substantially aligned with a respective combustion chamber when the rotor lobes are fully intermeshed. The ignition device is adapted to ignite the air/fuel mixture within the aligned combustion chamber, and whereby the combusted gases resulting from the ignition of the air/fuel mixture act upon the lobes to rotate the rotors. The engine further includes at least two exhaust ports formed in the housing in fluid communication with the pair of cavities. The combusted gases subsequently escape through the exhaust ports by further rotor rotation.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 3 is a simplified perspective view of the engine of FIG. 1;

FIG. 4 is a side view of a rotor of the dual rotor engine of FIG. 1;

DETAILED DESCRIPTION OF THE PREFERRED EMBODIMENT

The present invention will now be described with reference to the accompanying drawings where like numerals correspond to like elements. The present invention is directed to an internal combustion engine having dual counter-rotating rotors. Specifically, the present invention is directed to a dual rotor internal combustion engine that converts the energy created by combusted gas into dual rotating output shafts.

Figure 1:
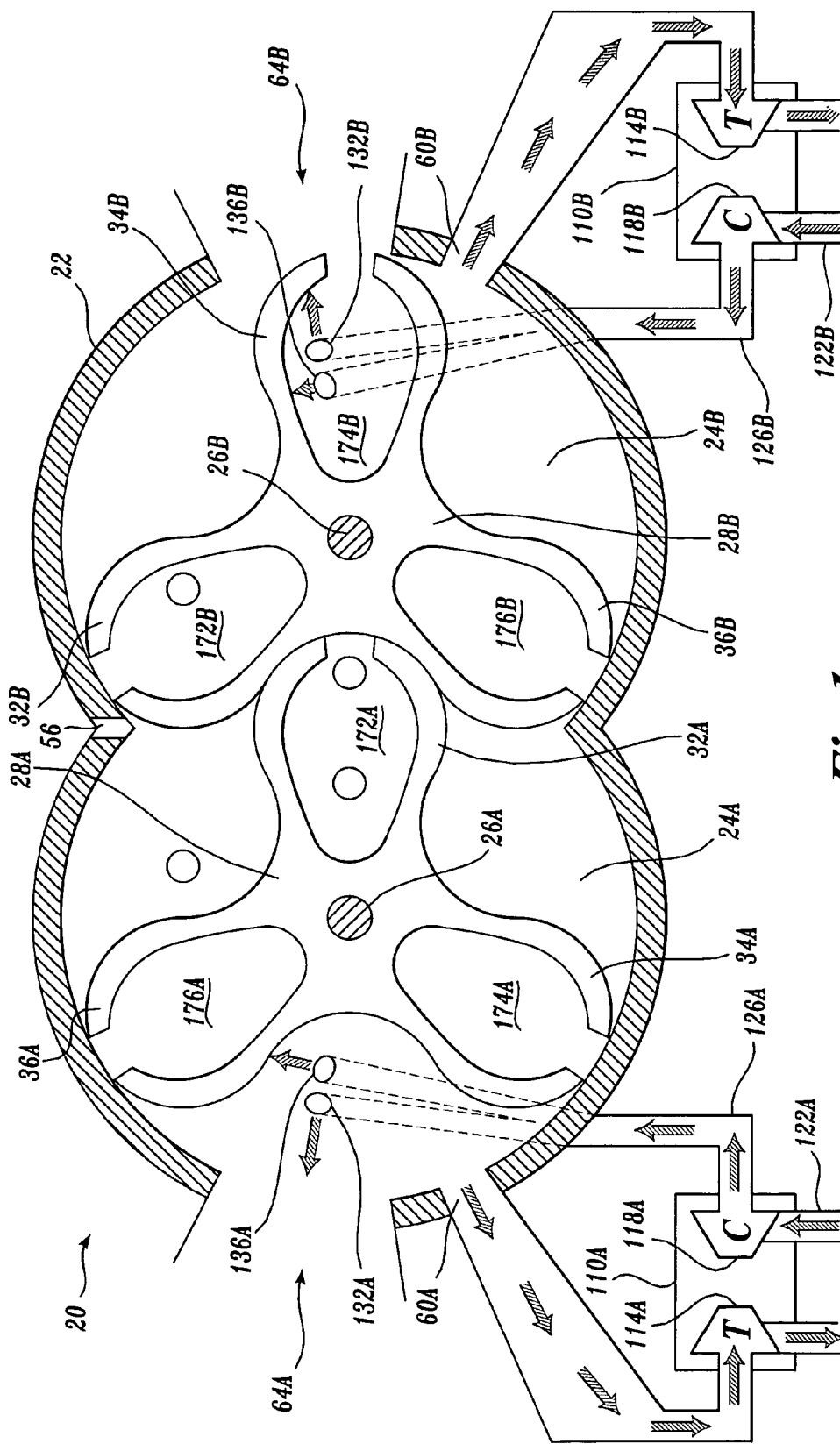
FIG. 1 is a schematic representation of a cross-sectional view of a dual rotor engine constructed in accordance with the present invention.

One suitable embodiment of a dual rotor internal combustion engine 20 ("the engine 20") constructed in accordance with aspects of the present invention is illustrated in FIG. 1. For ease of illustration, FIG. 1 is a schematic representation of the engine 20 shown in cross-section. The engine 20 includes a housing 22 that defines a pair of parallel cylindrical cavities 24A and 24B having intersecting regions. The engine 20 also includes a pair of parallel shafts 26A and 26B coplanar with a common horizontal plane. Each shaft 26A and 26B is journaled along the longitudinal axis of the housing 22 via conventional bearings for permitting rotation of the parallel shafts 26A and 26B within the cavities 24A and 24B. Rigidly secured to the shafts 26A and 26B for rotation therewith are first and second rotors 28A and 28B, respectively. In the embodiment shown, the rotors 28A and 28B have three lobes 32A, 34A, 36A and 32B, 34B, 36B spaced equidistant around the perimeter of the rotors 28A and 28B, respectively. The lobes 32A–32B, 34A–34B, 36A–36B define combustion chambers 172A–172B, 174A–174B, 176A–176B, respectively. The lobes 32A, 34A, 36A and 32B, 34B, 36B are shown as cycloidal; however, other intermeshable shapes may be used, such as ovaloidal. The first and second rotors 28A and 28B are fixedly secured to the shafts 26A and 26B for rotation therewith in an offset manner such that one lobe of rotor 28A meshes in-between two adjacent lobes of rotor 28B and vice versa.

In order to enable a near frictionless or contactless inner meshing of the first and second rotors, a pair of gears 30A and 30B are fixedly arranged on the shafts 26A and 26B outside one of the end walls 40 of the housing 22, as best shown in FIG. 3. The engine depicted in FIG. 3 is a simplified illustration of the engine for ease of illustration; however, it will be appreciated that the engine shown in FIG. 3 includes other features and components, as will be described in detail below. The gears 30A and 30B are sized and configured to mesh, thereby forming a force locking connection for synchronizing the rotation of the counter rotating shafts 26A and 26B. It will be appreciated that the gears 30A and 30B may be positioned adjacent one of the end walls 40 of the housing 22 as shown, or can be mounted a spaced-apart distance from one of the end walls 40 to provide space for other engine accessories or components, or to prove access to the housing 22 of the engine 20.

The shafts 26A and 26B may extend as drive shafts 52A, 54A and 52B, 54B, respectively, outside both end walls 40, and may be adapted to drive auxiliary mechanisms, such as alternators, distributors, water pumps, fluid pumps, if desired. The drive shafts 52A, 54A and 52B, 54B are further suitable to drive electric generators, dual propellers of a marine vehicle, wheels of land vehicles, to name a few. Additionally, it will be appreciated that the driveshafts may be utilized to drive separate and different components based on a particular application. For example, a vehicle, such as construction machinery, employing the engine 20 may utilize one drive shaft for providing the propulsion of the vehicle, while utilizing another drive shaft for coupling to a power take off (PTO) that drives hydraulic or pneumatic systems of such vehicles. Thus, any number of the drive shafts may be utilized depending on its intended application.

Figure 2:
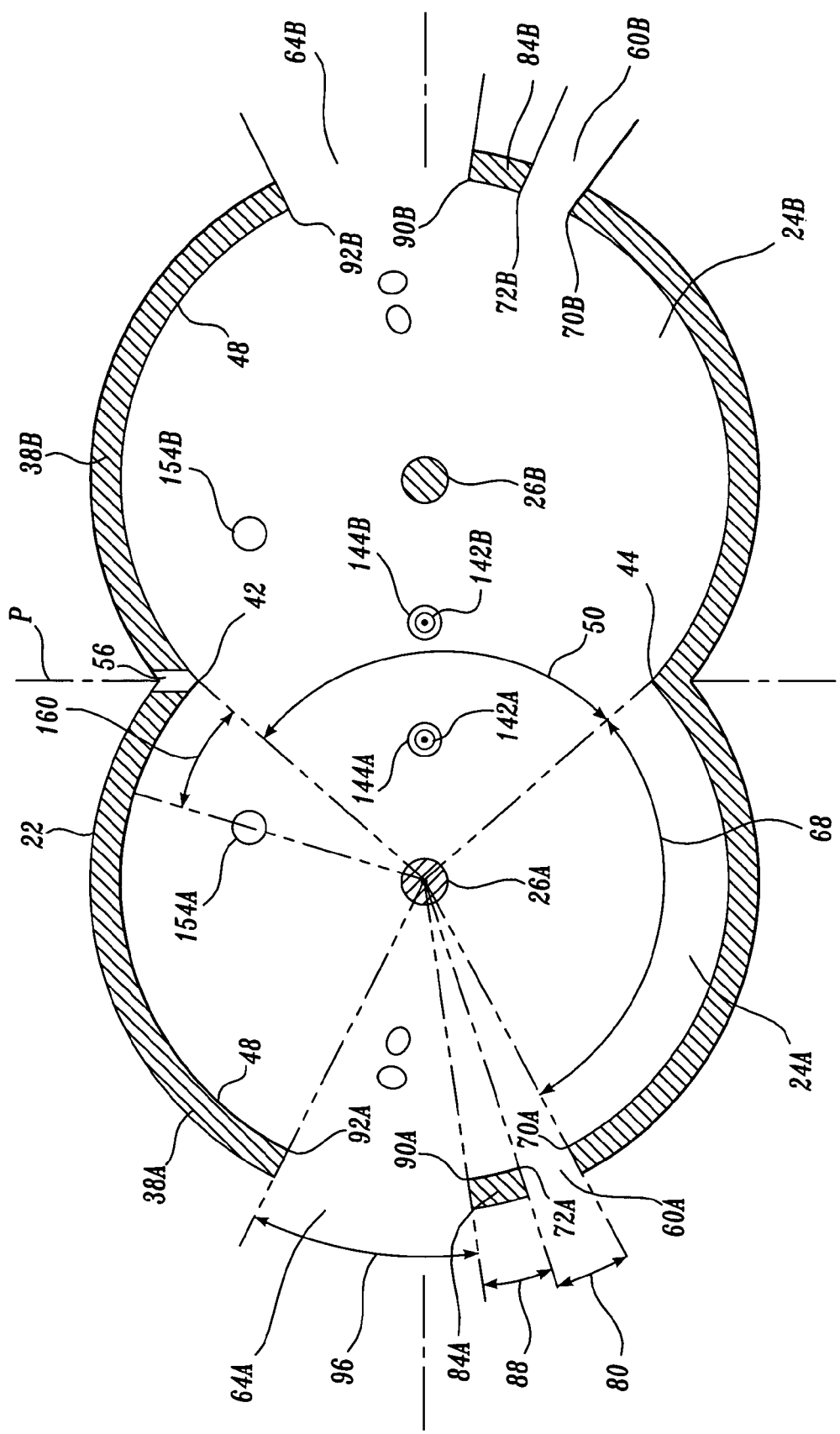
FIG. 2 is a schematic representation of a cross-sectional view of the housing of the dual rotor engine of FIG. 1.

Referring now to FIG. 2, the housing 22 will now be described in more detail. The housing 22 may be constructed out of any suitable engine block material known in the art, such as aluminum, cast iron or steel, to name a few, and fabricated using any conventional techniques, such as casting, CNC machining, or the like. The housing 22 includes a pair of parallel cylindrical wall sections 38A and 38B, which intersect at a common vertical plane P to form longitudinal edges generally referred to as the air plenum apex 42 and the exhaust plenum apex 44. Interior wall surfaces 48 of the intersecting cylindrical wall sections 38A and 38B, along with the inner surfaces of the end walls 40 (see FIG. 3) define the pair of side by side intersecting substantially cylindrical cavities 24A and 24B. The shafts 26A and 26B are respectively journaled by conventional bearings through bores (hidden by the shafts in FIG. 2) that are disposed through the end walls 40 (see FIG. 3) and positioned coaxially with the longitudinal axis of each cavity 24A and 24B. The distance between the apex 42 and the apex 44 may be defined in terms of angle 50, the vertex of which is the center point of either shaft 26A or 26B. In the embodiment shown, angle 50 is approximately 95°. The housing 22 is configured to be substantially symmetrical about the vertical plane P. At the location of the apex 42, there is formed a pressure relief port 56 connected in fluid communication with the cavities 24A and 24B, which may be valve regulated by a conventional pressure relief valve (not shown) that opens at a selected cavity pressure (e.g., 200 psi), for relieving pressure build-up in the engine during use.

The housing 22 further includes two primary exhaust ports 60A and 60B and two secondary exhaust ports 64A and 64B formed in the first and second cylinder wall sections 38A and 38B, respectively, and disposed symmetrically about the common vertical plane P. Alternatively, the primary and secondary exhaust ports may be formed in any engine block surface and may consist of multiple ports. In the embodiment shown, the beginning edges 70A and 70B of the primary exhaust ports 60A and 60B begin at angles of rotation past the exhaust plenum apex 44, generally designated 68, which is preferably about 110° in this embodiment. The ending edges 72A and 72B of the primary exhaust ports 60A and 60B are disposed at angles of rotation 80, preferably about 10 degrees, past the beginning edges 70A and 70B, respectively. Outer wall sections or intervals 84A and 84B are formed between the primary and secondary exhaust ports, respectively. The length of the intervals 84A and 84B is defined by angles of rotation 88 formed between the primary exhaust port ending edges 72A and 72B and the secondary exhaust port beginning edges 90A and 90B. Angles of rotation 88 are approximately 10 degrees in this embodiment, and may correspond to the rotation angle of the combustion chamber openings, as will be described below. Alternatively, the angles of rotation 88 can be greater or less than 10 degrees, if desired. The secondary exhaust ports 64A and 64B terminate at ending edges 92A and 92B, which are at angles of rotation, generally designated 96, past the beginning edges 90A and 90B. In the embodiment shown, angles of rotation 96 are preferably about 35°. As such, the remaining angles of rotation from the ending edges of the secondary exhaust ports 64A and 64B to the air plenum apex 42, respectively, is approximately 100°.

In accordance with aspects of the present invention, the location (defined as the angle of rotation 68 past the apex 44) of the beginning edges 70A and 70B of the primary exhaust ports 60A and 60B, respectively, may be determined by the following equation (1).

$$L = (360/N) - X \qquad (1)$$

wherein

L=location of the beginning of the primary exhaust ports 60A and 60B determined as an angle of rotation from the exhaust plenum apex 44, generally designated 68;

N=number of combustion chambers per rotor; and

X=angle of rotation, in degrees, that defines the opening of each combustion chamber.

Thus, in the embodiment of FIGS. 1–4, wherein N equals 3 and X equals 10 degrees, L, or the angle of rotation 68, equals 110 degrees, as was described above.

Referring back to FIG. 1, the primary exhaust ports 60A–60B may transport exhaust gas produced from combustion of an air/fuel mixture in the cavities 24A–24B to conventional turbochargers 110A and 110B. The turbochargers 110A and 110B include turbines 114A and 114B in fluid communication with the primary exhaust ports 60A and 60B to receive exhausted gas. The turbines 114A and 114B, driven by the exhausted gases, in turn, drive compressors 118A and 118B. Fresh air is taken in via air lines 122A and 122B via the compressors 118A and 118B of the turbochargers 110A and 110B and supplied by the compressors 118A and 118B to air intake ports 132A and 132B via passageways 126A and 126B. Air intake ports 132A and 132B are disposed in the housing 22 (in one of the end walls 40) and connected in fluid communication with the cavities 24A–24B. The intake ports 132A and 132B may be disposed at approximately between 130–160 degrees of rotation clockwise and counter clockwise from the apex 44, respectively, and in the embodiment shown, preferably between 145–150 degrees. The intake ports 132A and 132B are preferably configured to introduce air from the turbochargers 110A and 110B into the cavities 24A and 24B in a radially outward manner, as shown by the arrows. The housing 22 may be optionally configured with auxiliary intake ports 136A and 136B positioned adjacent to intake ports 132A and 132B, respectively, and connected in fluid communication with the passageways 126A and 126B. The auxiliary ports 136A and 136B are preferably configured to introduce air into the cavities 24A and 24B in the direction of rotor rotation, as shown by the arrows, the benefits of which will be described in detail below.

In one embodiment (not shown), other ports may be disposed in the end wall opposite the intake ports 132A and 132B and optional intake ports 136A and 136B. It is believed by the inventor that the additional ports will allow the introduced air to blow through the chambers, creating additional turbulence and added cooling and exhausting capabilities.

While the primary exhaust ports 60A and 60B have been described above and shown herein to be connected to two turbochargers 110A and 110B, it will be apparent to one of ordinary skill in the art that the primary exhaust ports 60A and 60B may be connected to a single turbocharger. Additionally, while turbochargers are shown to introduce quantities of fresh air to the cavities via the intake ports 132A and 132B and optional 136A and 136B, other devices may be used for such introduction of fresh air. For example, the intake ports may be connected in fluid communication to blowers, fans, superchargers, to name a few, which are all known in the art.

The secondary exhaust ports 64A and 64B transport combusted gases to atmosphere through exhaust passageways. It will be apparent to those skilled in the art that the exhaust passageways may be connected in a conventional manner to catalytic converters, mufflers, exhaust pipes, or any combinations thereof, and the like. Alternatively, to further harness the energy of the exhausted gases, the secondary exhaust ports 64A and 64B may be connected in fluid communication to turbochargers configured with second turbines to drive, in conjunction with first turbines connected to the primary exhaust ports 60A and 60B, a compressor of a modified two turbine turbocharger.

Referring now to FIG. 2, two ignition devices, such as spark plugs 142A and 142B, are connected to the housing 22 through apertures 144A and 144B, respectively, in any conventional manner. The spark plugs 142A and 142B are either recess mounted or flush mounted within the apertures 144A and 144B so as to not interfere with rotor rotation. The spark plug apertures 144A and 144B may be formed into one or both end walls 40 (see FIG. 3) of the housing. The spark plugs 142A and 142B, adapted to be connected to any power source known in the art for such purposes, deliver a charge to the cavities 24A and 24B for initiating the combustion of a fuel/air mixture. The spark plug apertures 144A and 144B are spaced apart and may be coplanar with the shafts 26A and 26B as shown, or alternatively, may be coplanar with the vertical plane P. While only two spark plug apertures are shown, it will be appreciated that multiple sets of spark plug apertures, and thus, multiple sets of spark plugs may be used with the present invention to provide a more complete combustion of the air-fuel mixture, if desired. Additionally, it will be appreciated that the spark plug apertures, and thus, the spark plugs, may be positioned anywhere that is in communication with the combustion chamber 172A when the rotors are in the position shown in FIG. 1.

Further formed in the housing 22 at one or both end walls 40 (see FIG. 3) are fuel injector ports 154A and 154B adapted to be connected to a source of fuel and in fluid communication with cavities 24A and 24B for supplying the cavities with fuel. Embodiments of the present invention may utilize throttle body or multi-port (sequential) electronic fuel injection to inject fuel to the cavities through fuel injector ports 154A and 154B, as known in the art. However, it will be appreciated that the fuel or a fuel/air mixture may be injected into the chambers using conventional carburetors or other mechanical means, as will be described in more detail below, along with or separate from the electronic fuel injection. The fuel used in the present invention may be any combustible fluid, for example, gasoline, alcohol, or hydrogen, to name a few.

The fuel injector ports 154A and 154B are disposed in the end walls 40 (see FIG. 8) of the housing 22 such that the bisecting line of each injector port 154A and 154B is positioned at an angle of rotation 160 (See FIG. 2), preferably about 30 degrees, counterclockwise and clockwise from the air plenum apex 42, respectively. It will be appreciated that the angle of rotation 160 may be less than 30 degrees, and may range from about 30 degrees or greater (e.g., 45 degrees) to about negative 15 degrees of rotation from the apex 42 for prolonging the exhaust cycle of the secondary exhaust ports. The fuel injector ports 154A and 154B are preferably configured to introduce fuel (or fuel/air mixture) in the direction of the lower combustion chamber walls to aid in keeping the fuel from being centrifuged out of the combustion chambers by rotor rotation, and to create turbulence and circulation of the fuel and air, thereby improving the mixing process between the injected fuel and the air present within the combustion chambers. It will be appreciated that the fuel injector ports 154A and 154B are spaced a sufficient distance radially outward of the shafts 26A and 26B such that fuel may be injected into the combustion chambers of the rotor lobes as the injection ports 154A and 154B come into alignment therewith.

Referring now to FIG. 4, the first and second rotors will now be described in detail. Since the first and second rotors are substantially identical in construction, only the first rotor 28A will be described in detail. As was briefly discussed above, the first rotor 28A is formed with three radially extending cycloidal lobes 32A, 34A, and 36A, defining combustion chambers 172A, 174A, and 176A, respectively. The cycloidal lobes 32A, 34A, and 36A are disposed equidistant apart, such that the angle, designated 168, formed between the longitudinal axes bisecting adjacent lobes is 120°. The length between the center point of the rotor and the free ends of the lobes is slightly less than the radius of the cavities so that the rotors may freely rotate within the cavities, but will provide sufficient sealing between the lobes and the inner wall surfaces of the cylinder sections (e.g., tolerances between the free ends of the lobes and the inner surfaces of the cylinder wall sections of hundredths of an inch, or even thousandths of an inch are contemplated).

The combustion chambers 172A, 174A, 176A open at the free ends of the lobes 32A, 34A, and 36A, respectively. The openings have widths defined by an angle 180 (also referred to as an angle of rotation and expressed by "X" in equation (1) described above) formed by imaginary lines extending from the rotational center point (RCP) of the rotor 28A and extending through outer lobe leading and trailing edges 184A and 188A, respectively. In one embodiment, the angle 180 is preferably about 10°, and preferably corresponds with the width of the intervals 84A and 84B and the primary exhaust ports 60A and 60B. However, other angles larger or smaller than 10 degrees are also contemplated to be within the scope of the present invention, as well as angle 180 having a different value than the width of the intervals and/or the primary exhaust ports 60A and 60B.

Figure 15:
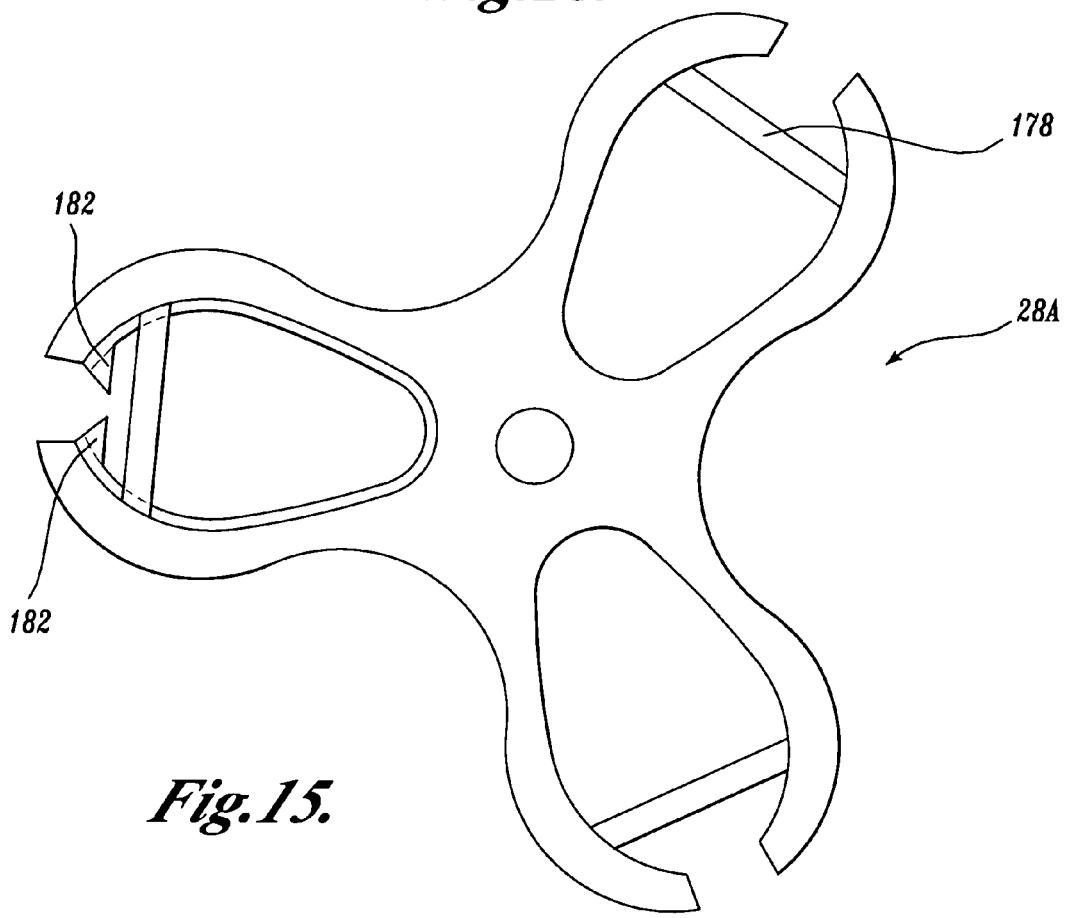
FIG. 15 is a side view of an alternative embodiment of the rotor suitable for use in an engine constructed in accordance with the present invention.

The particular shape of the combustion chambers is not a part of the present invention, and therefore will not be described in any more detail. However, it will be appreciated that any shape and size may be practiced with the present invention so long as the rotor lobe side walls remain sufficiently rigid to contain the expansion of the air/fuel mixture combusted without unwanted rotor flexing. In one embodiment, the rotor lobes may be optionally braced or reinforced with reinforcement bars 178, as shown in FIG. 15, to resist flexion of the lobe side walls. It will be appreciated that the diameter of the reinforcement bars 178 is less than the lengthwise dimension of the chamber openings, so that the combusted gas is permitted to exit the combustion chambers. The reinforcement bars 178 may be secured by drilling holes in the lobe side walls and tapping (i.e., threading) the holes to receive the bars 178, although other techniques, such as welding, may be used. Additionally, the combustion chambers may be formed with projections 182 adjacent the opening of the combustion chamber. The projections 182 are cup-like or hollow in configuration and extend along the leading and trailing edges of the lobe for aiding in the retention of fuel within the combustion chamber during rotation. The projections 182 may be constructed as a stainless steel liner insertable into the combustion chamber from the side of the rotors.

The operation of the engine 20 in accordance with the present invention will now be described, with particular reference to FIGS. 5–12. For ease of illustration and clarity in the following description, the turbochargers are not shown; however, it will be appreciated that the turbochargers may be part of one embodiment of the present invention and may be configured as shown in FIG. 1. In FIGS. 5–12, the rotors 28A and 28B are illustrated in eight (8) sequentially occurring positions. These positions follow the cycles of one rotor lobe 32A (shown in cross-section throughout FIGS. 5 and 12) through one complete revolution of the shafts 26A and 26B. Generally described, each lobe of the rotors 28A and 28B, and thus, each combustion chamber operates through six cycles, which may overlap, as will be explained in greater detail below. The cycles are: 1) ventilation; 2) fuel injection; 3) displacement compounding compression; 4) combustion; 5) expansion; and 6) exhaust.

Figure 5:
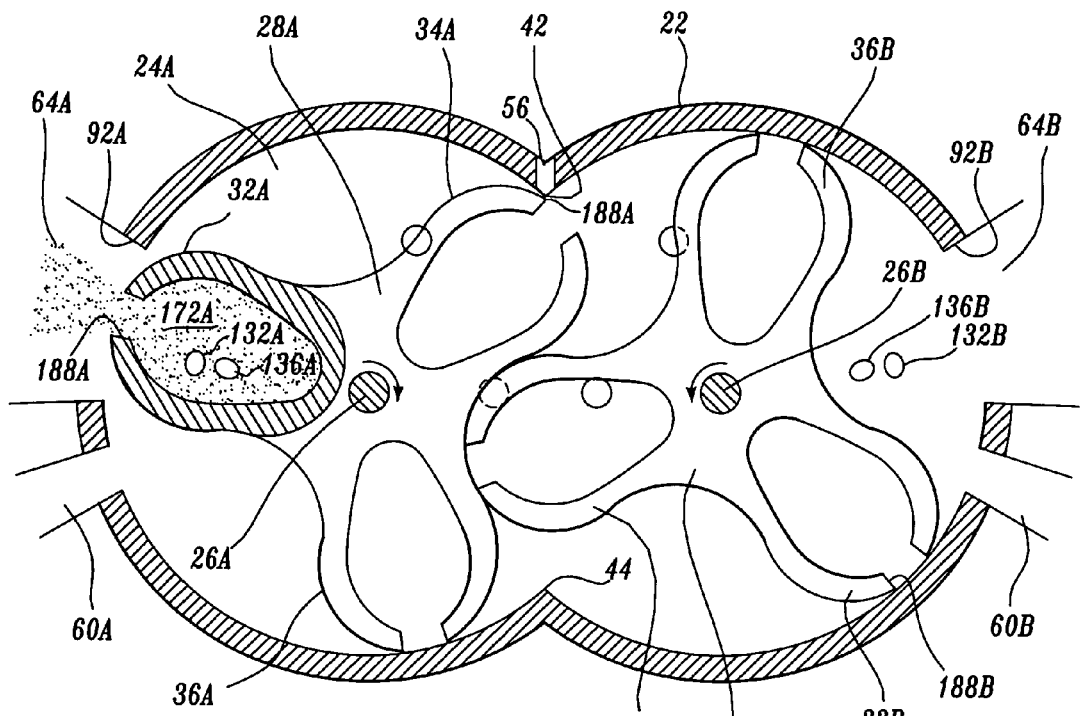
FIGS. 5–12 depict sequential positions of the rotors of the engine of FIG. 1 as one combustion chamber of the engine operates through its six cycles.

In this particular description, the cycles of the engine 20 will begin at FIG. 5. As best shown in FIG. 5, the rotor 28A is positioned such that the longitudinal axis of the lobe 32A is approximately coaxial with the bisecting axis of the secondary exhaust port 64A of the housing 22, the trailing edge 188A of lobe 34A is in near proximity to the apex 42, and the lobe 34B is intermeshed between the lobes 34A and 36A. In this position, the turbocharger (see FIG. 1), driven by exhausted gases from a previous exhaust cycle, as will be described in more detail below, injects fresh air into the cavity 24A, and more specifically, into the combustion chamber 172A through intake port 132A, and optional intake port 136A. Alternatively, air injection by other means such as a conventional supercharger, blower, fan, or a pressurized reservoir of air, may be utilized in place of, or in conjunction with, the turbochargers. Due to the preferable configuration of the port 132A, air is introduced radially outward toward the secondary exhaust port 64A. This causes the introduced air to ventilate the exhaust gases (shown as dots) still present in the combustion chamber 172A into the secondary exhaust port 64A, while filling the chamber 172A with fresh air. Not only does the fresh air ventilate the chamber 172A, but also further functions to cool the housing 22 and the rotors. As such, the fresh air routed to the intake ports may be introduced first to a conventional intercooler prior to introduction into the cavities to further cool the engine.

This completes the ventilation cycle, where fresh air is injected into the combustion chamber 172A and the remaining combusted gas from the combustion chamber is removed. In this case, the turbocharger acts as an air pump to pump large volumes of air into and through the combustion chamber 172A to vent the combusted gases from the chambers, while supplying fresh air thereto. Thus, the turbocharger may be generally referred to as a turbo-ventilator. It will be appreciated that the ventilation cycle begins when the intake ports 132A and/or 136A are in fluid communication with the chamber 172A, and ends approximately when the intake ports 132A and/or 136A cease to fluidly communicate with chamber 172A. It will also be appreciated that the exhaust cycle of a previous lobe may occur concurrently with the ventilating cycle, as will be described in detail below.

Figure 6:
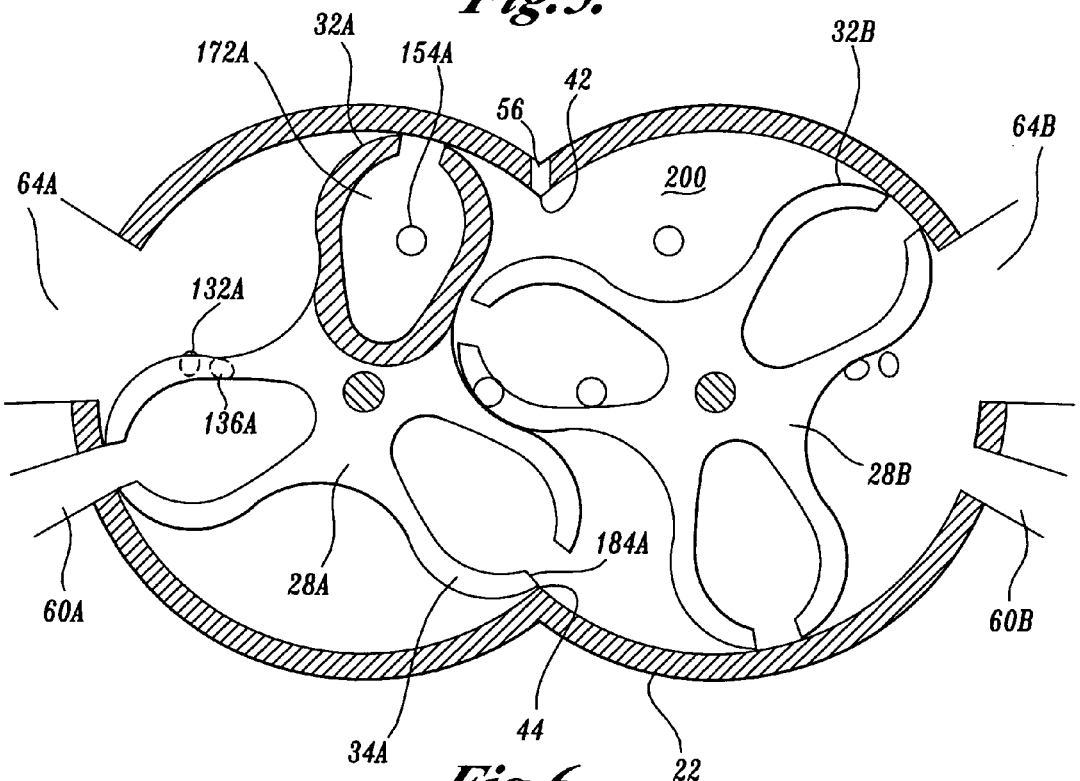

From FIG. 5, the rotors 28A and 28B rotate in the direction of the arrows to a position shown in FIG. 6 due to the expansion forces of the combusted gases of another combustion chamber. FIG. 6 illustrates the rotor 28A in a position such that the fuel injector port 154A is in fluid communication with chamber 172A, and the leading edge 184A of lobe 34A is in close proximity to the apex 44. In this position, the fuel injector port 154A injects fuel into the freshly air filled chamber 172A, which instantly vaporizes to form an air/fuel mixture. This is generally referred to as the fuel injection cycle. Embodiments of the present invention may utilize electronic fuel injection to inject fuel to the combustion chambers, as known in the art. However, it will be appreciated that fuel or a fuel/air mixture may be injected into the chambers using a conventional carburetor or other mechanical means, as will be described in more detail below, along with or separate from the electronic fuel injection.

Figure 7:
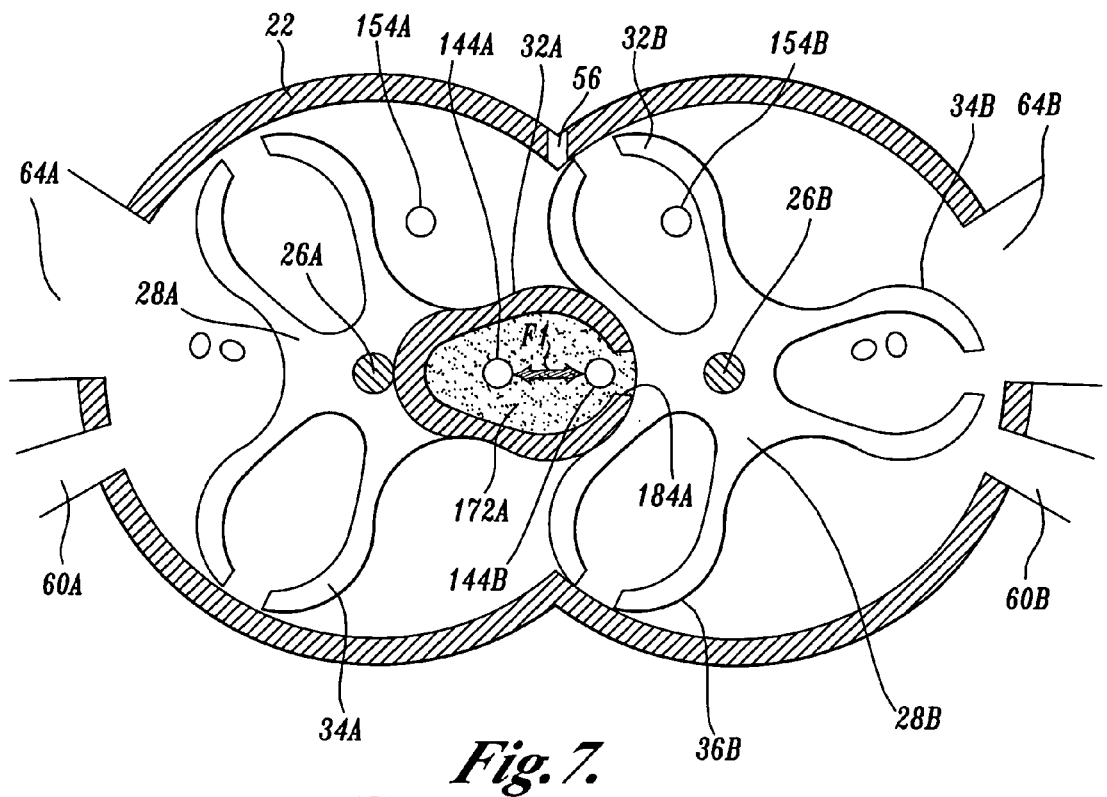

During the operation of the engine, the rotors 28A and 28B continue to rotate from the position shown in FIG. 6 to the position shown in FIG. 7. As the rotors rotate from FIG. 6 to FIG. 7, air located in chamber 200 (which may also contain an amount of combusted gas from a previous cycle) may be forced into the chamber 172A by the pumping action of the outer wall of lobe 32B rotating counter-clockwise toward the chamber 172A. It will be appreciated that this pumping action may compress the air/fuel mixture and/or increase the volume of air present in the chamber 172A. This is generally referred to as the displacement compound compression cycle. Additionally, it will be appreciated that during the displacement compound compression cycle, pressures within the chambers formed by the intermeshing lobes 32B and 32A adjacent the apex 42 and in fluid communication with the port 56 may increase enough to vent through the port 56. In embodiments where the port is pressure relief valve regulated, the pressure build-up within the created chambers will vent if the pressure exceeds a pre-selected threshold (e.g. 200 psi).

FIG. 7 illustrates the rotors 28A and 28B in a position where the lobe 32A is oriented such that the longitudinal axis of the lobe 32A is substantially coaxial with the horizontal line interconnecting the shafts 26A and 26B, the combustion chamber 172A is substantially closed by the free end of the lobe 32A juxtaposed the outer surface of the rotor 28B between lobes 32B and 36B, the spark plugs are in communication with chamber 172A through spark plug apertures 144A and 144B, and the chamber 172A contains an air/fuel mixture for subsequent combustion. At this time, the spark plugs receive a charge from the distributor or other known device in a conventional manner and fire, thereby igniting the air/fuel mixture contained within the combustion chamber 172A. The combusted gases (shown as dots throughout the FIGURES) generate an expansive force, generally referred to as the axial force, and designated by double headed arrows F1. As the combusted gases continue to apply pressure to the concave portion of the opposite rotor 28B from the axial force F1, and the subsequent expansion of the gas, the rotor 28B rotates counterclockwise, which in turn, rotates the rotor 28A due to the synchronizing gears to the position shown in FIG. 8. While the spark plugs may be controlled to fire at the instant the longitudinal axis of lobe 32A is coaxial with shafts 26A and 26B so that the shafts may help contain the expansive forces upon combustion, it will be appreciated that the spark plugs may be controlled to fire a few degrees of rotation (e.g.; to about 10 degrees) prior to or past the common shaft axis.

Figure 8:
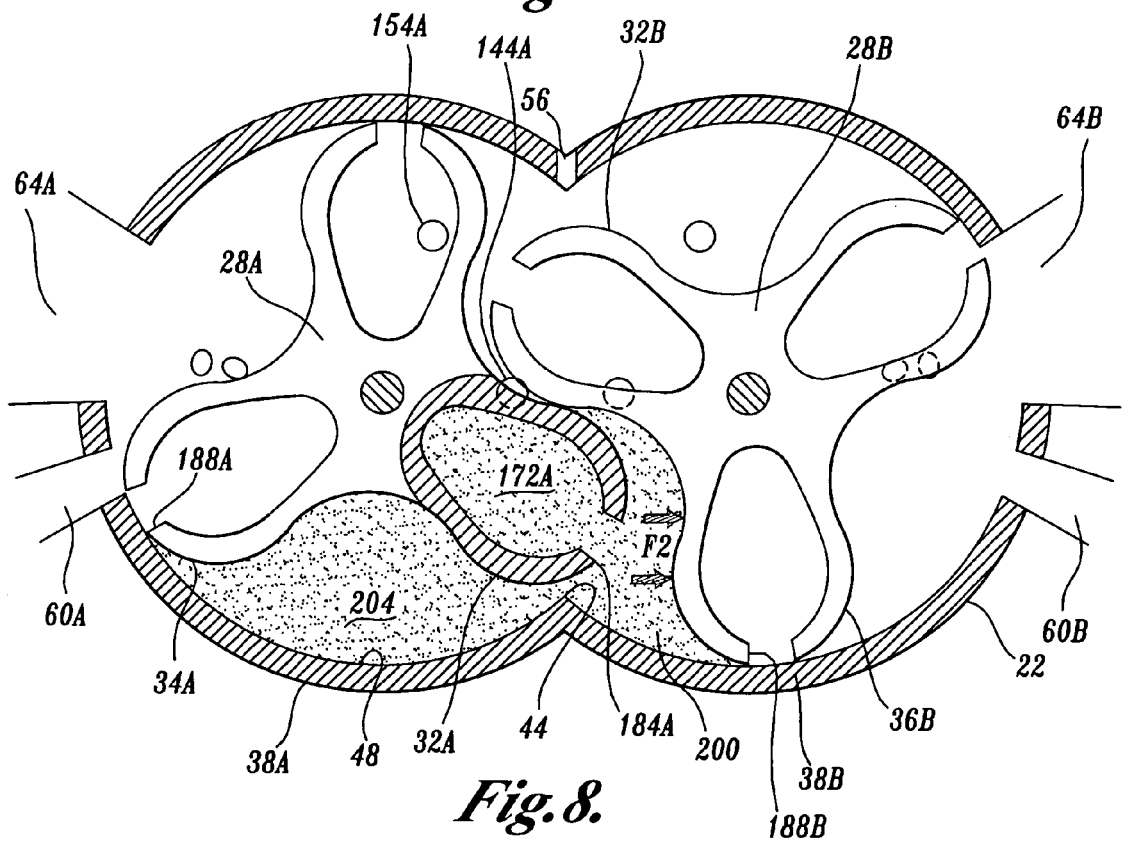

As the leading edge 184A of lobe 32A separates from the concave portion of the opposite rotor 28B as the rotors 28A and 28B rotate from the position shown in FIG. 7 to position shown in FIG. 8, the combusted gases escape from the combustion chamber 172A, and expand into a chamber 204 created by combustion chamber 172A, the space delimited between the outer walls of lobes 32A and 34A and the inner wall surfaces 48 of cylinder section 38A beginning at the trailing edge 188A of lobe 34A and ending at the apex 44, and the space delimited between the outer walls of lobes 32B and 36B (that face the lobe 32A) and the inner wall surface 48 of the cylindrical section 38B beginning at the trailing edge 188B of lobe 36B and ending at apex 44. As the combusted gases escape from combustion chamber 172A into the newly created chamber 204, the combusted gases expand in volume, which in turn, compound compresses the combusted gases currently present in the chamber (and already at an elevated pressure) from another cycle, thereby creating a second force F2 shown in FIG. 8. Thus, the secondary expansion of the gas when occupying the chamber 204, and the simultaneous compound compression of the existing gases, applies force F2 against the side of the rotor lobe 36B, which in turn, causes the rotor 28B to rotate counter-clockwise. This is generally referred to as the expansion cycle, whereby the energy from the combustion cycle is further harnessed to rotate the rotors 28A and 28B. As will be continued to be explained, the expansion cycle may continue to operate as the rotors continue to rotate. The length of the expansion cycle may depend on several variables, such as the amount of air/fuel mixture present at the combustion cycle.

Figure 9:
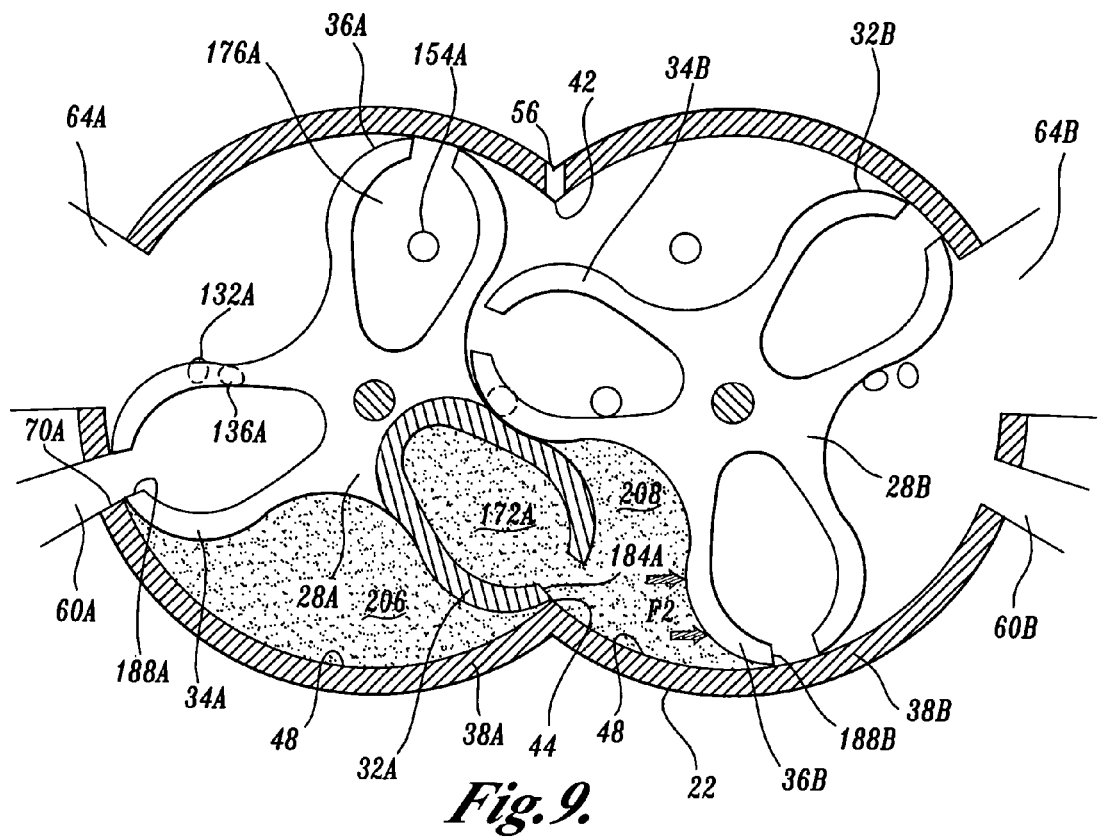

The rotors 28A and 28B continue to rotate due to the expansion cycle to the position of FIG. 9. As the leading edge 184A of the lobe 32A comes into close proximity to the exhaust plenum apex 44, shown best in FIG. 9, the trailing edge 188A of lobe 34A comes into close proximity to the primary exhaust port beginning edge 70A, and the chamber 204 (FIG. 8) divides to form chambers 206 and 208. Chamber 206 is delimited by the outer surface of adjacent lobes 32A and 34A of the rotor 28A and the adjoining inner surface 48 of the cylinder wall between the apex 44 and the beginning edge 70A of the primary exhaust port 60A. The chamber 208 is delimited by the combustion chamber 172A and the adjacent lobes 32A and 36B of rotor 28B and the adjoining inner surface 48 of the cylinder wall section 38B extending from the trailing edge 188B of the lobe 36B to the apex 44. At this point, the combusted gases contained within chamber 208 are under high pressure, and the remaining force F2 from the compound compressed combusted gases impact against the lobe 36B of the rotor 28B, which in turn, rotates the rotor 28B in a counterclockwise direction.

Figure 10:
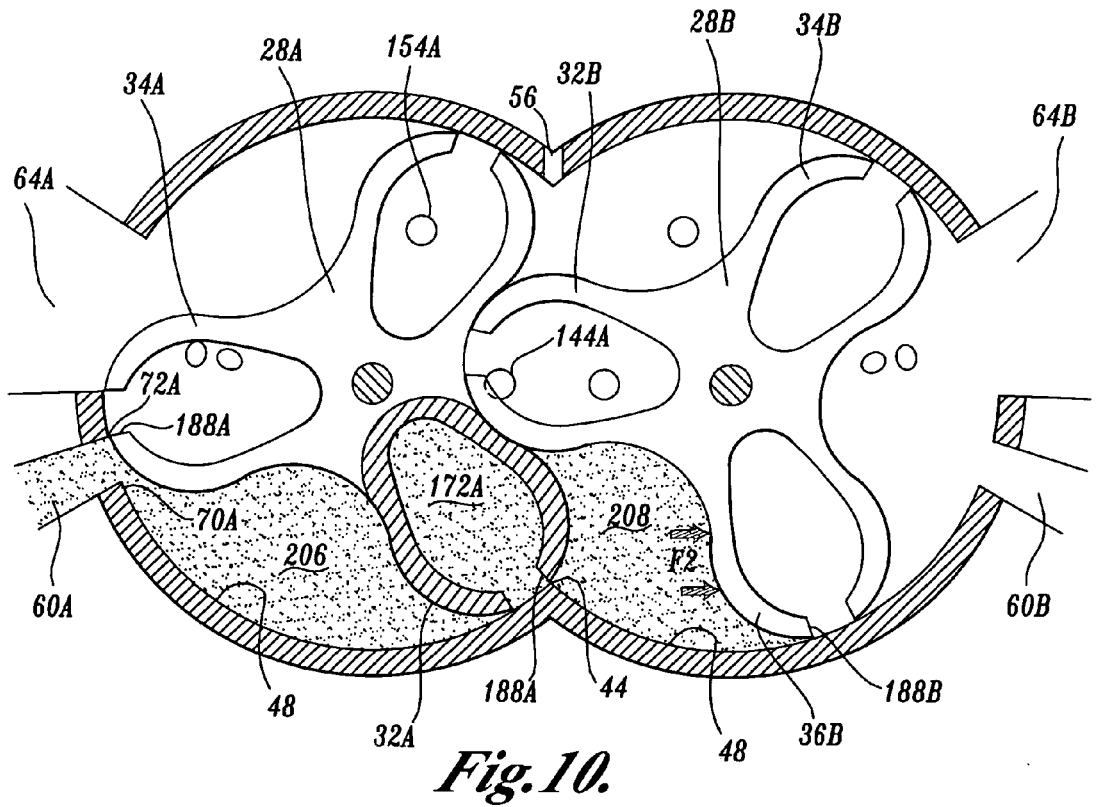

As the rotors rotate from the position shown in FIG. 9 to the position shown in FIG. 10, the trailing edge 188A of lobe 34A passes the beginning edge 70A of primary exhaust port 60A to the ending edge 72A, and the trailing edge 188A of the lobe 32A is adjacent the apex 44, causing the following to occur. First, this establishes fluid communication between the chamber 206 and the primary exhaust port 60A, which in turn, begins the primary exhaust portion of the exhaust cycle of chamber 206 across the primary exhaust port 60A. Since the exhaust port 60A is at a lower pressure than the chamber 206 of combusted gases, the combusted gases exits the chamber 206 into the primary exhaust port 60A. The combusted gases are exhausted through the port 60A and routed to the turbine of the turbocharger, as described above, or alternatively, routed to atmosphere.

Secondly, the combustion chamber 172A containing exhausted gases therein, separates from the chamber 208. Finally, the compound compressed gas in chamber 208 may continue to exert force F2 against the outer wall of the lobe 36B, and thus, prolong the expansion cycle described above. It will be appreciated that the volume of chamber 208, now delimited by the outer surface of adjacent lobes 32B and 36B, the adjoining inner surface 48 of the cylinder wall between the trailing edge 188B of the lobe 36B and the apex 44, and the adjoining outer wall portion of the lobe 32A from the trailing edge 188A of the lobe 32A to the interface between the lobe 32A and the lobe 32B, continues to enlarge as the rotor 28B rotates, thus decreasing the pressure therein.

Figure 11:
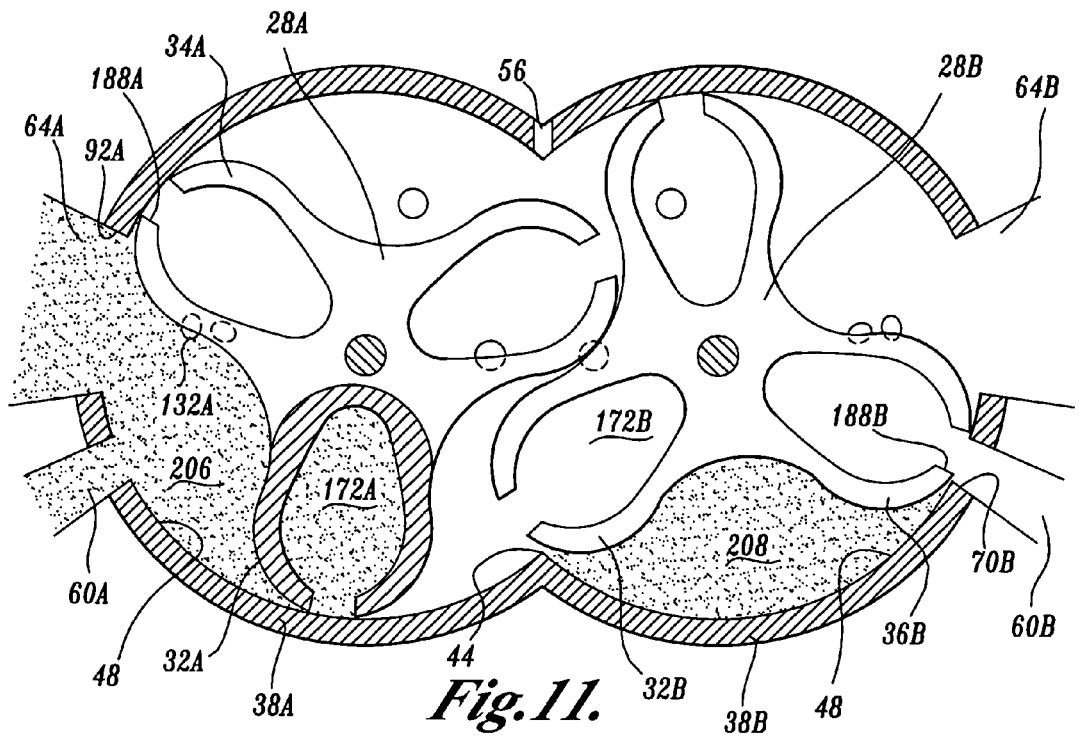

From the position shown in FIG. 10, the rotors rotate to the position shown in FIG. 11 due in part by subsequent combustion cycles in the combustion chambers of other lobes. In FIG. 11, the trailing edge 188A of the lobe 34A is past the ending edge 92A of the secondary exhaust port 64A. As the trailing edge 188A of the lobe 34A rotates from its position in FIG. 10 at the ending edge 72A of the primary exhaust port 60A to a position past the ending edge 92A of the secondary exhaust port 64A, chamber 206 establishes fluid communication with the secondary exhaust port 64A, which in turn, begins the secondary exhaust portion of the exhaust cycle of chamber 206 across the secondary exhaust port 64A. Since the exhaust port 64A is at a lower pressure than the chamber 206 of combusted gases, the combusted gases exit the chamber 206 into the secondary exhaust port 64A. The combusted gases are exhausted through the port 64A and routed to atmosphere, or alternatively, to a turbine of the turbocharger. Thus, at this time, the exhausted gases previously contained in chamber 206 are being exhausted through primary and secondary ports 60A and 64A, respectively.

Figure 12:
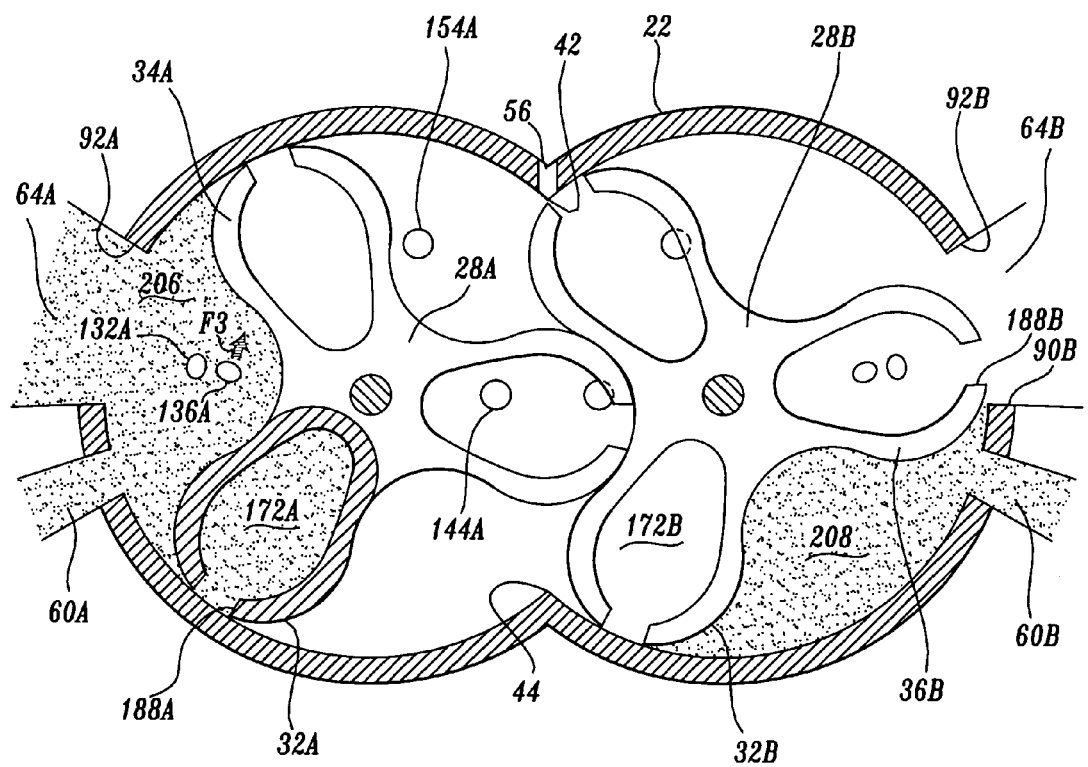

The operation of the engine continues to rotate the rotors 28A and 28B to the position shown in FIG. 12. As best shown in FIG. 12, the trailing edge 188B of lobe 36B has rotated past the beginning edge 90B of the secondary exhaust port 64B, and thus, establishes fluid communication between the chamber 208 and the primary exhaust port 60B and the secondary exhaust port 64B. This begins the primary and secondary exhaust portions of the exhaust cycle of chamber 208 across the primary and secondary exhaust ports 60B and 64B. Since the exhaust ports 60B and 64B are at a lower pressure than the chamber 208 of combusted gases, the combusted gases exits the chamber 208 into the primary and secondary exhaust ports 60B and 64B. The combusted gases are exhausted through the ports 60B and 64B and routed to either atmosphere or to a turbine of the turbocharger described above. Concurrently with the exhausting of combusted gases from chamber 208, the combusted gases of chamber 206 continue their primary and secondary portions of the exhaust cycle across the primary and secondary exhaust ports 60A and 64A. As the exhaust cycle occurs, fresh air is injected into the housing through intake ports 132A and the optional intake port 136A. As was described above, the optional intake port is preferably configured to introduce air into the housing in the direction of rotor rotation. The air, introduced in the direction of rotor rotation, imparts a force, generally designated F3, against the outer wall of the rotor lobe 34A. Thus, the injected air aids in the rotation of the rotors, while aiding in the exhaust cycles of the combustion chambers.

From the rotor position shown in FIG. 12 to the beginning rotor position of FIG. 5, the chambers 206 and 208 continue to exhaust combusted gases through the primary and secondary exhaust ports 60A, 64A and 60B, 64B, respectively. Additionally, as the combustion chamber 172A of the lobe 32A passes the primary exhaust port 60A to the secondary exhaust port 64A, fluid communication is established therebetween, and thus, the combustion chamber 172A begins its primary and secondary portion of the exhaust cycle. Thus, the exhaust cycle begins when the chambers 206 and 208 establish fluid communication with the primary exhaust ports 60A and 60B, and ends when the trailing edge 188A of the lobe 32A passes the ending edge 92A of the secondary exhaust port 64A and the trailing edge 188B of the lobe 36B passes the ending edge 92B of the secondary exhaust port 64B.

While only the cycles of lobe 32A in the operation of engine 20 were described in detail, it will be appreciated that the other lobes were operating through their respective cycles concurrently with lobe 32A.

Figure 13:
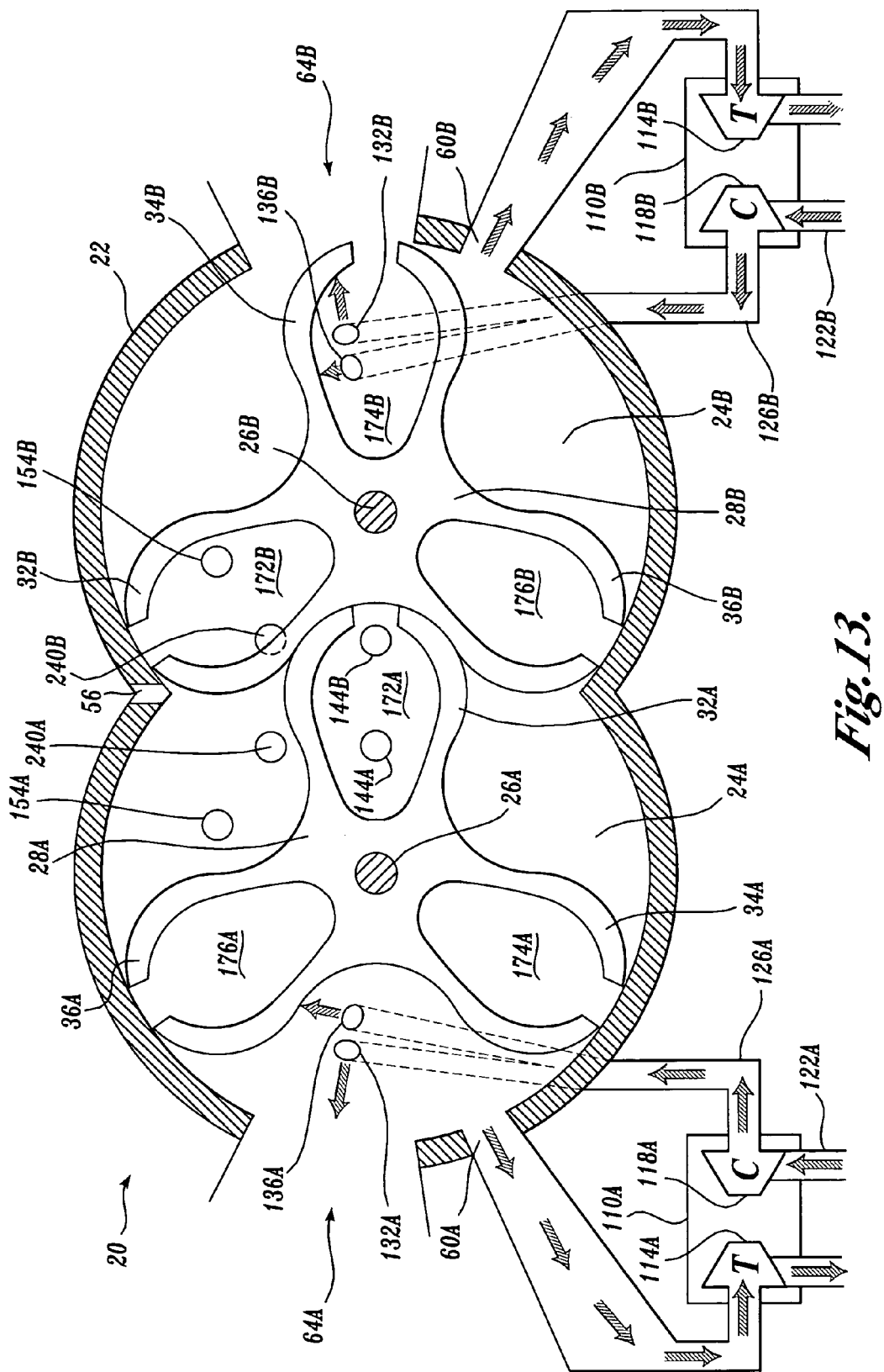
FIG. 13 is a schematic representation of a cross-sectional view of another embodiment of the engine constructed in accordance with the present invention, wherein the engine further includes additional intake ports.

In another embodiment of the present invention, the engine 20 may optionally include intake ports 240A and 240B located in-between the fuel injector ports 154A and 154B and the spark plug apertures 144A and 144B, respectively, for injecting air, or combustible gases, from supply conduits into the combustion chambers, as best shown in FIG. 13. The injected air may operate to increase the compression ratio of the air/fuel mixture and/or increase the total volume of air contained within the combustion chambers, thereby increasing engine output. The supply of air from the supply conduits to the intake ports 240A and 240B may be electronically controlled by a conventional controller, such as an engine control unit (ECU) in communication with a valving mechanism, such as a solenoid valve. It will be appreciated that the source of air supplied to the intake ports 240A and 240B may be injected by suitable use of conventional air pumps, blowers or compressors, mechanically connected to one of the drive shafts.

In operation, when each combustion chamber of the rotors 28A and 28B rotates into alignment with a respective intake port 240A or 240B, air is injected into the respective combustion chamber by the operation of the valving mechanism (not shown), which receives a control signal from the ECU.

Figure 14:
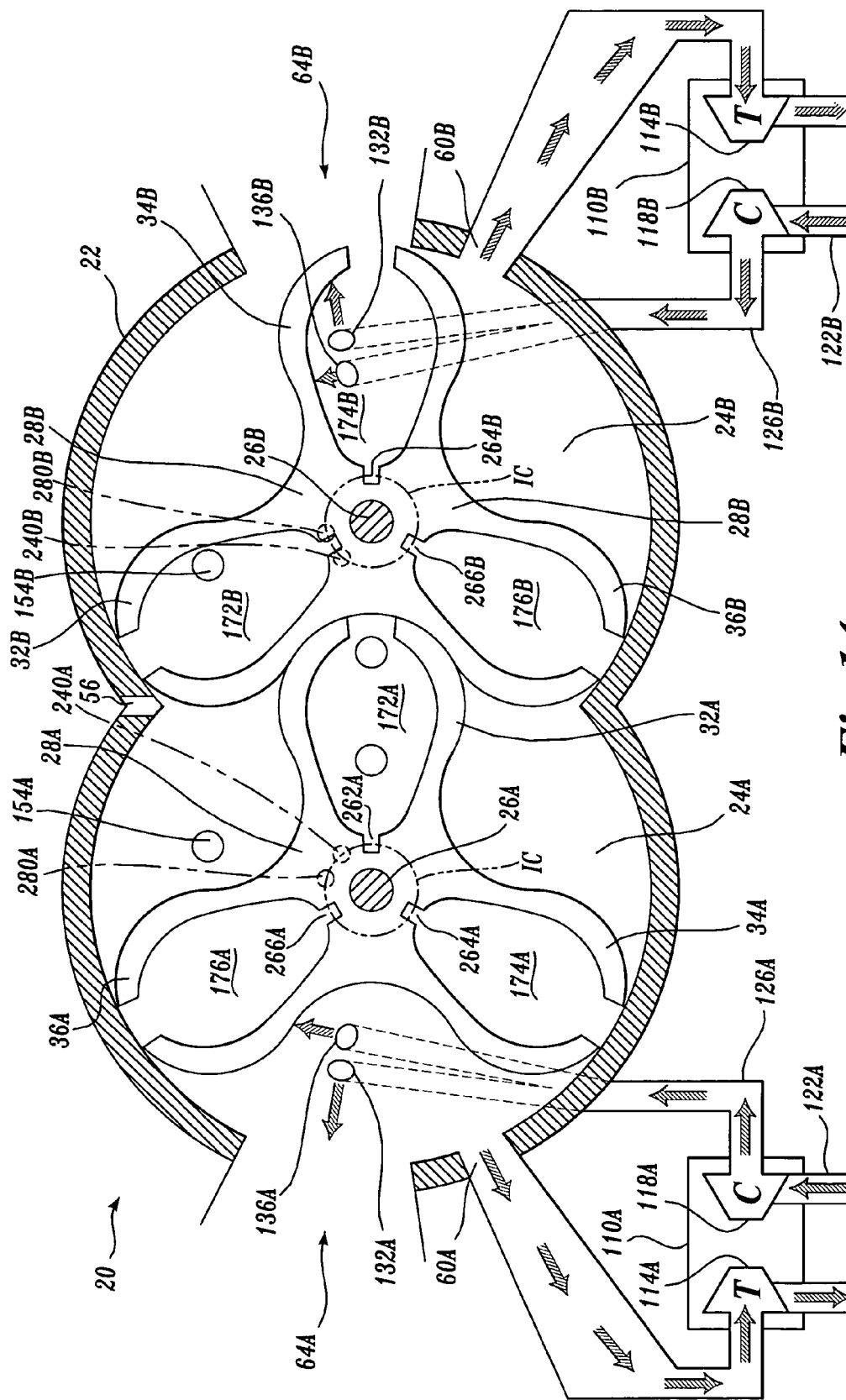
FIG. 14 is a schematic representation of a cross-sectional view of another embodiment of the engine constructed in accordance with the present invention, wherein the engine further includes additional fuel intake ports and/or intake ports for the introduction of air or other engine output increasing components, such as water or nitrous oxide.

Alternatively, the supply of air injected into the combustion chambers from the optional intake ports just described may be controlled mechanically, as will now be explained in greater detail. Turning now to FIG. 14, the engine includes intake ports 240A and 240B positioned radially inward from the embodiment shown in FIG. 13. Specifically, the intake ports 240A and 240B are disposed in one of the end walls 40 (FIG. 3) and centered on an imaginary circle IC of radius R coaxially with the shafts 26A and 26B. The radius R of the imaginary circle IC is selected such that the ports 240A and 240B lie between the inward end of the combustion chambers and the outer surface of the shafts. In conjunction with the placement of the intake ports 240A and 240B, the rotors 28A and 28B further include grooves 262A–262B, 264A–264B, and 266A–266B formed in the central hub section of the rotors 28A and 28B and associated with each combustion chamber. Each groove extends lengthwise through the entire hub section and is configured and arranged to fluidly communicate with its respective combustion chamber.

In operation, when each groove of the rotors 28A and 28B rotates into alignment with a respective intake port 240A or 240B, air is automatically injected into the respective combustion chamber though its associated groove. As the groove associated with the respective combustion chamber rotates past the respective intake port, the supply of air is cut off by the end face of the central hub portion of the respective rotor. It will be appreciated that the amount of air injected can be metered by any combination of rail pressure in the supply conduit, and the size and shape of the intake ports and/or the grooves. Additionally, the air supply conduit may also be valve controlled, if desired.

While air has been described in this embodiment to potentially increase engine output, air is not the only component available to potentially achieve such results. For example, water, or nitrous oxide or other volatile gaseous or liquid components may be injected into the intake ports 240A and 240B to potentially increase engine work output.

In accordance with another embodiment of the present invention, the engine 20 may use mechanical techniques similar to the mechanically controlled supply of air just described for injecting fuel and/or air/fuel mixtures into the combustion chambers. To that end, the engine 20 may further include intake ports 280A and 280B positioned radially inward from the intake ports 154A and 154B and approximately centered on the imaginary circle IC of radius R. The intake ports 280A and 280B are adapted to be connected to a source of fuel or an air/fuel mixture. It should be noted that in this embodiment, the intake ports 240A and 240B and intake ports 154A and 154B may be omitted, if desired. If the intake ports 240A and 240B are utilized by an embodiment of the engine as shown in FIG. 14, it will be appreciated that the ports 280A and 280B are spaced a distance, in degrees of rotation, from the ports 240A and 240B. Alternatively, in accordance with another embodiment of the present invention, one set of ports, either ports 240A and 240B or 280A and 280B may be used to inject both the fuel/air mixture and the air or other engine output increasing component described above, while the other ports are omitted. In this particular embodiment, the ports may be connected to separate sources of fuel and air (or other engine output increasing components described above) and controlled by a valving mechanism. Such an arrangement may be constructed by one skilled in the art with components well known in the art.

In operation, when a groove of the rotors 28A and 28B rotates into alignment with the fuel injector ports 280A or 280B, fuel or an air/fuel mixture is automatically injected into the respective combustion chamber, and as the groove rotates passed the respective fuel injector port, the supply of fuel or an air/fuel mixture is cut off by the end face of the respective rotor. It will be appreciated that a control valve may be used, for instances such as when the engine is shut off. In accordance with another embodiment of the present invention, the injector ports 280A–280B may be used in conjunction with the injector ports 154A and 154B as shown in FIG. 14, to provide flexibility in supplying fuel to the combustion chambers during varying engine operating conditions. For example, the first set of fuel injector ports 280A and 280B may be connected to a source of fuel and operate during normal operating conditions. The second set of fuel intake ports 154A and 154B may be connected to conventional electronic fuel injectors and can operate during peak engine conditions. When the engine is operating under normal operating conditions, the intake ports 280A and 280B are used to inject fuel into the combustion chambers. As the demand for more engine output is needed, the fuel intake ports 154A and 154B may be used in conjunction with the intake ports 280A and 280B to supply more fuel to the combustion chambers.

Figure 18:
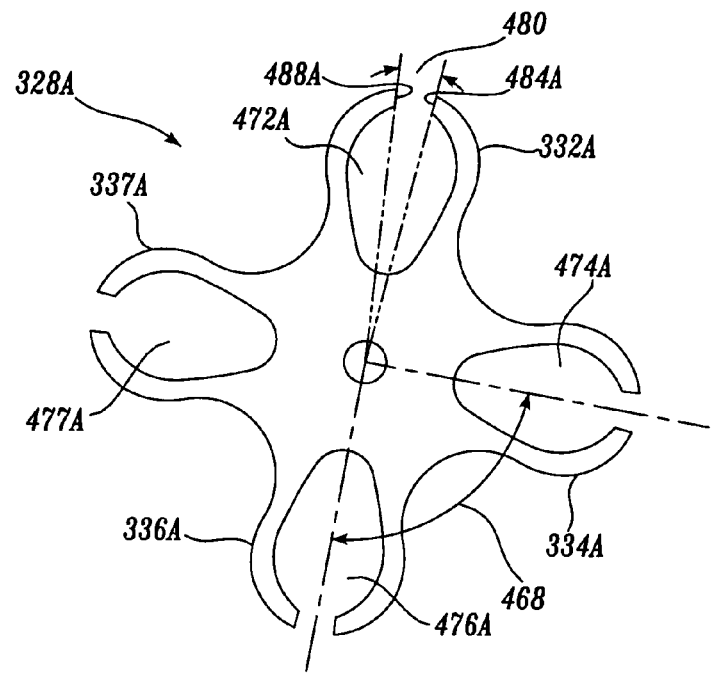
FIG. 18 is a side view of a rotor of the dual rotor engine of FIG. 16.
Figure 16:
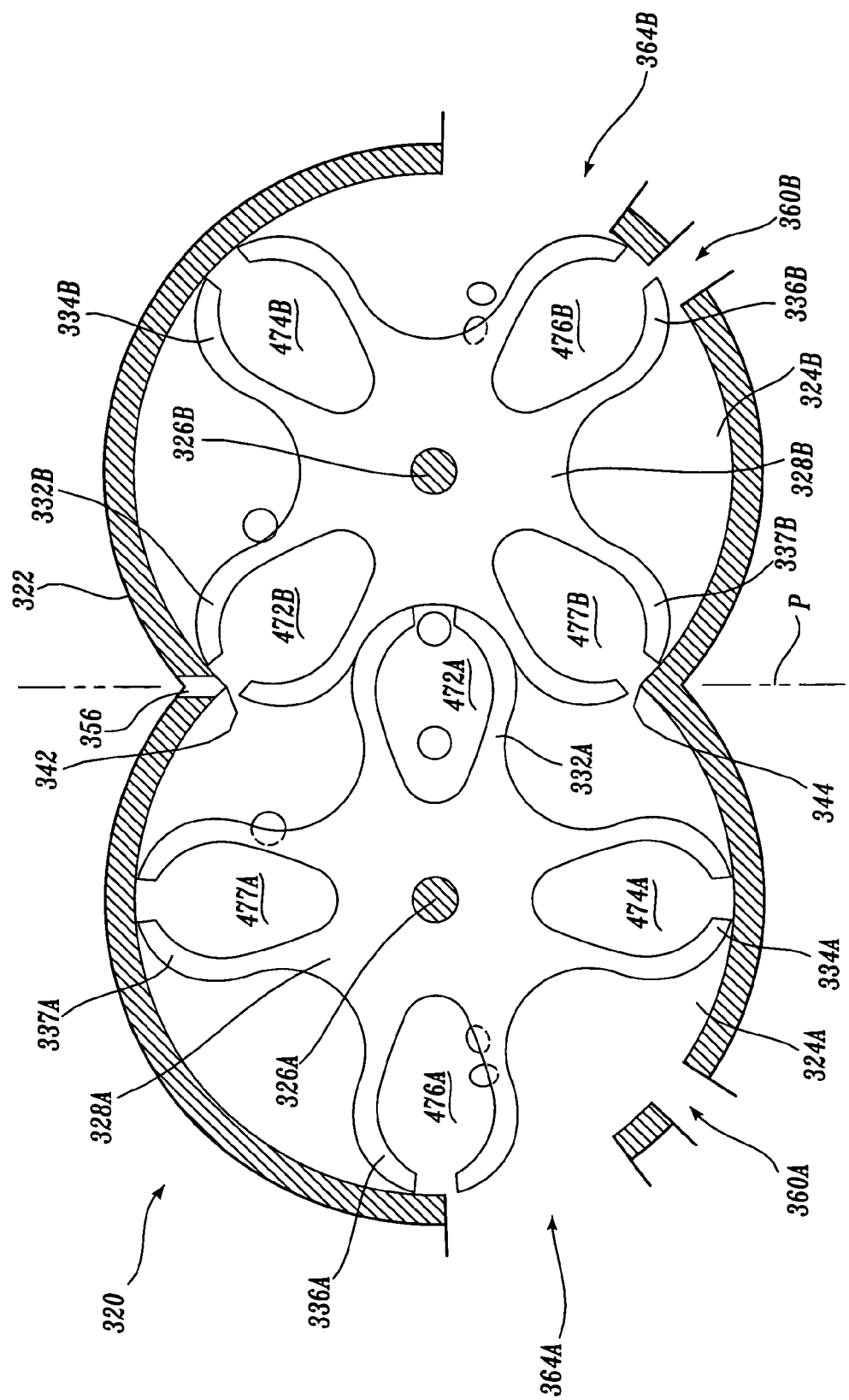
FIG. 16 is a schematic representation of a cross-sectional view of another embodiment of the engine constructed in accordance with the present invention, wherein the rotors each include four lobes defining combustion chambers.
Figure 17:
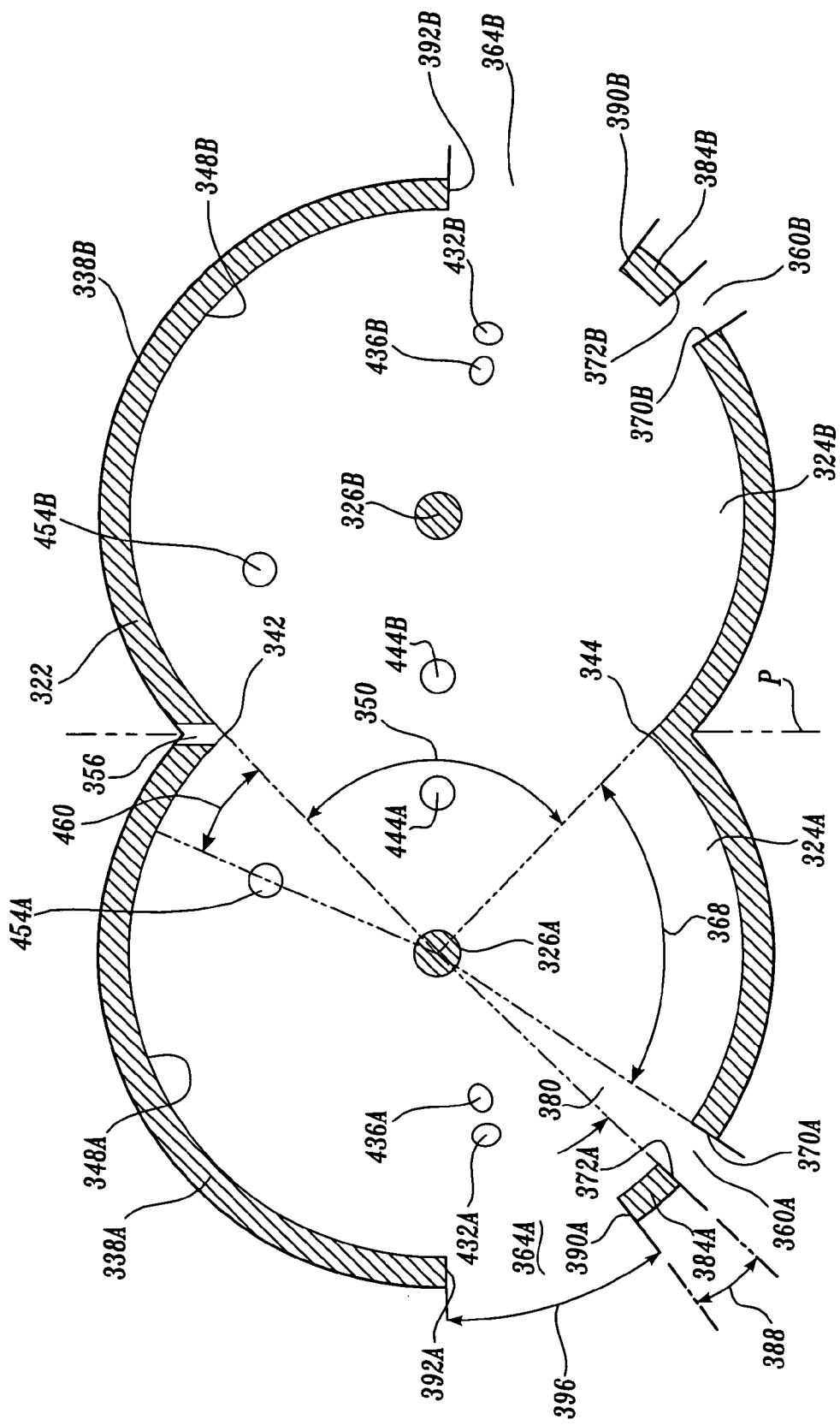
FIG. 17 is a schematic representation of a cross-sectional view of the housing of the engine of FIG. 16.

In the embodiment of the engine 20 described above and illustrated in FIGS. 1–14, the rotors included three lobes each defining a combustion chamber. However, other embodiments of the present invention may utilize rotors having any number of like numbered lobes. Turning now to FIGS 16–18, another embodiment of a dual rotor engine 320 is shown in accordance with aspects of the present invention. The engine 320 in FIGS. 16–18 is substantially identical in construction and operation as the engine 20 shown in FIG. 1, except for the differences that will now be described. For clarity in the ensuing description, like or similar elements will have the same reference numeral beginning with either the prefix 300 or 400. For example, the housing in this embodiment is now reference numeral 322.

As best shown in FIGS. 16 and 17, the rotors 328A and 328B have four cycloidal lobes 332A, 334A, 336A, 337A, and 332B, 334B, 336B, 337B spaced equidistant around the perimeter of the rotors 328A and 328B, respectively. The cycloidal lobes 332A, 334A, 336A, and 337A are disposed equidistant apart, such that the angle, designated 468 (See FIG. 18), formed between the longitudinal axes bisecting adjacent lobes is 90°. Each lobe 332A, 334A, 336A, 337A of the rotor 328A is formed with combustion chambers 472A, 474A, and 476A, and 477A, respectively, while each lobe 332B, 334B, 336B, 337B of the rotor 328B is formed with combustion chambers 472B, 474B, and 476B, and 477B, respectively.

Referring now to FIG. 17, the housing 322 is configured such that the angle 350 between the apex 342 and the apex 344 is approximately 88 degrees. The housing 322 also includes two primary exhaust ports 360A and 360B and two secondary exhaust ports 364A and 364B formed in the first and second cylinder wall sections 338A and 338B, respectively, and disposed symmetrically about the common vertical plane P. The beginning edges 370A and 370B of the primary exhaust ports 360A and 360B begin at an angle of rotation, designated 368, past the apex 44. The angle of rotation 368 of the beginning edges 370A and 370B of the primary exhaust ports may be determined by equation (1) above. Thus, with X preferably being 10 degrees, the angle of rotation 368 equals 80 degrees ((360 degrees/4)−10 degrees=80 degrees).

The ending edges 372A and 372B of the primary exhaust ports 360A and 360B are at the angles of rotation 380, preferably about 10 degrees, past the beginning edges 370A–370B, respectively. An outer wall section or interval 384 is disposed between the primary and secondary exhaust ports, respectively. The length of the intervals 384 is defined by an angle of rotation 388 formed between the primary exhaust port ending edges 372A and 372B and the secondary exhaust port beginning edges 390A and 390B, respectively. Angle of rotation 388 is approximately 10° in this embodiment, but can be greater than or less than 10 degrees, if desired. The secondary exhaust ports 364A and 364B end at the ending edges 392A and 392B, which are at angles of rotation, designated 396, past the beginning edges 390A and 390B. In the embodiment shown, the angles 396 are preferably 35°; however, angles of up to about 70 degrees may be used.

While representative embodiments of the invention have been illustrated and described, it will be appreciated that various changes can be made therein without departing from the spirit and scope of the invention, as claimed. For example, the fuel injectors may be positioned in other areas, if desired. Additionally, in some embodiments, the intervals may be omitted so that the primary and secondary ports become one large port, which could vary in size.

What is claimed is:

1. An engine comprising:
   a housing defining parallel cylindrically shaped intersecting cavities, the intersecting cavities forming spaced-apart parallel first and second edges;
   a pair of parallel shafts rotatably mounted within the cavities, the pair of parallel shafts extending outside the housing to form at least one drive shaft; and
   first and second intermeshing rotors rotatably mounted within the housing, each rotor configured with a central hub portion coupled to one of the shafts for rotation therewith and a number of radially outward extending lobes defining open ended combustion chambers.

2. The engine of claim 1, wherein each rotor further includes a fluid supply channel formed in the central hub portion for each combustion chamber, the fluid supply channels connected in fluid communication with the respective combustion chambers, and selectively connected in fluid communication with a source of fluid.

3. The engine of claim 2, wherein the fluid is air or fuel.

4. An engine comprising:
   a housing including a pair of end walls and a pair of intersecting parallel cylinder walls having inner wall surfaces that define first and second interconnected cylindrical cavities, the intersecting cylinder walls forming spaced-apart parallel first and second edges;
   first and second shafts extending coaxially in the cavities and supported for rotation at the end walls; and
   first and second rotors secured to said first and second shafts for rotation in the respective cavities, the first and second rotors each having a plurality of radially extending lobes with outer ends, each lobe defining a combustion chamber that opens at the lobe outer end.

5. The engine of claim 4, wherein the first and second shafts are coupled together for rotation in opposite directions in a synchronous manner.

6. The engine of claim 4, wherein the lobes are cycloidal or ovoidal.

7. The engine of claim 4, wherein at least one of the lobes includes a reinforcement member positioned in the combustion chamber of the lobe.

8. The engine of claim 4, wherein at least one concave projection may be formed in each combustion chamber for collecting fuel during rotation.

9. The engine of claim 1, further comprising at least one ignition device associated with the housing.

10. The engine of claim 9, wherein the ignition device is a spark plug.

11. The engine of claim 4, further including at Least two exhaust ports formed in the housing in fluid communication with the first and second cavities.

12. The engine of claim 11, wherein the exhaust ports are symmetrically arranged on opposite sides of a bisecting plane coplanar with the first and second edges.

13. The engine of claim 11, further comprising third and fourth exhaust ports formed in the housing in fluid communication with the pair of cavities, the third and fourth exhaust ports being symmetrically arranged on opposite sides of a bisecting plane coplanar with the first and second edges and spaced a selected distance of rotation from the first and second exhaust ports, respectively.

14. The engine of claim 13, wherein the selected distance of rotation is approximately equal to or greater than 10 degrees.

15. The engine of claim 4, further comprising first and second intake ports in fluid communication with the first and second cavities, respectively.

16. The engine of claim 15, wherein the center line of the intake ports are positioned at an angle of rotation in the range of between approximately 45 degrees and approximately negative 15 degrees from the first edge.

17. The engine of claim 15, wherein the intake ports are connected to a source of fluid.

18. The engine of claim 17, wherein the source of fluid is supplied by a device selected from a group consisting of a turbocharger, a blower, a supercharger, and a fan.

19. The engine of claim 17, wherein the fluid is selected from the group consisting of air and combustible fluids.

20. The engine of claim 1, further comprising first and second air intake ports formed in the housing and in fluid communication with the cavities, the first and second air intake ports connected in fluid communication with a source of air for injecting air to the cavities.

21. The engine of claim 20, wherein the first and second air intake ports receive the air from a turbocharger.

22. The engine of claim 21, further comprising at least two exhaust ports Conned in the housing in fluid communication with the first and second cavities, the exhaust ports further in fluid communication with the turbocharger.

23. The engine of claim 21, wherein the first and second air intake ports receive the air from a pump driven by one of the first or second shafts.

24. The engine of claim 20, further including first and second fuel intake ports formed in the housing and in fluid communication with the cavities.

25. The engine of claim 24, wherein the first and second fuel intake ports are connected in fluid communication with a source of fuel.

26. The engine of claim 25, wherein the source of fuel is a selectively controlled fuel injector nozzle.

27. The engine of claim 25, wherein the source of fuel deliverable to the cavities is controlled by the rotation of the rotors.

28. An engine comprising:
   a housing including a pair of end walls and a pair of intersecting parallel cylinder walls having inner wall surfaces that define first and second interconnected cylindrical cavities, the intersecting cylinder walls forming spaced-apart parallel first and second edges;
   first and second shafts extending coaxially in the cavities and supported for rotation at the end walls;
   first and second rotors secured to said first and second shafts for rotation in the respective cavities, the first and second rotors each having a plurality of radially extending lobes with outer ends, each lobe defining a combustion chamber that opens at the lobe outer end; and
   at least two exhaust ports formed in the housing in fluid communication with the first and second cavities;
   wherein the exhaust ports include beginning edges and ending edges, the exhaust ports being positioned such that the beginning edges are positioned at a selected angle of rotation clockwise and counter-clockwise from the second edge, respectively.

29. The engine of claim 28, wherein the selected angle of rotation is approximately 110 degrees.

30. The engine of claim 28, wherein the selected angle of rotation is approximately 80 degrees.

31. An engine comprising:
- a housing formed with a pair of side-by-side intersecting substantially cylindrical cavities, the intersecting cylindrical cavities forming spaced-apart parallel first and second edges;
- a pair of counter-rotating power rotors rotatably mounted in the cavities, the pair of power rotors including intermeshing lobes each defining open ended combustion chambers;
- at least two exhaust ports formed in the housing in fluid communication with the pair of cavities;
- an ignition device in communication with the cavities;
- first and second fuel intake ports disposed in the housing and connected in fluid communication with the cavities; and
- first and second air intake ports disposed in the housing and connected in fluid communication with the cavities.

32. The engine of claim 31, further comprising third and fourth air intake ports disposed in the housing and connected in fluid communication with the cavities.

33. The engine of claim 31, further comprising third and fourth fuel intake ports disposed in the housing and connected in fluid communication with the cavities.

34. The engine of claim 33, wherein the third and fourth fuel intake ports are operable to inject fuel into the cavities during selected engine operating conditions.

35. An engine comprising:
- a housing formed with a pair of side-by-side intersecting substantially cylindrical cavities, the intersecting cylindrical cavities forming spaced-apart parallel first and second edges;
- a pair of counter-rotating power rotors rotatably mounted in the cavities, the pair of power rotors including intermeshing lobes each defining open ended combustion chambers;
- first and second intake ports formed in the housing and connected in fluid communication with the cavities and a source of air for injecting air to each combustion chamber;
- third and fourth intake ports formed in the housing and connected in fluid communication with the cavities and a source of fuel for injecting fuel into each air filled combustion chamber to form an air/fuel mixture;
- an ignition device coupled to the housing and substantially aligned with a respective combustion chamber when the rotor lobes are fully intermeshed, the ignition device adapted to ignite the air/fuel mixture within the aligned combustion chamber, and whereby the combusted gases resulting from the ignition of the air/fuel mixture act upon the lobes to rotate the rotors; and
- at least two exhaust ports formed in the housing in fluid communication with the pair of cavities, wherein the combusted gases will subsequently escape through the exhaust ports by further rotor rotation.

36. The engine of claim 35, wherein the third and fourth intake ports are configured to inject fuel into the cavities toward the chamber walls of the cavities.

37. The engine of claim 35, wherein the exhaust ports are symmetrically arranged on opposite sides of a bisecting plane of the housing that bisects the housing at the intersection of the cavities.

38. The engine of claim 37, wherein the first and second intake ports are configured to inject air into the cavities in a radially outward manner toward the exhaust ports.

39. A rotary combustion engine, comprising:
- a housing including a pair of end walls and a pair of intersecting parallel cylinder walls having inner wall surfaces that define first and second interconnected cylindrical cavities, the intersecting cylinder walls forming spaced-apart parallel first and second edges;
- first and second shafts extending coaxially in the cavities and supported for rotation; and
- first and second rotors secured to said first and second shafts for rotation in the respective cavities, the first and second rotors each having a plurality of radially extending integrally formed lobes with outer ends, each lobe defining a combustion chamber that opens at the lobe outer end;
- wherein each combustion chamber is absent of a valve or piston.

40. An engine, comprising:
- a housing including a pair of end walls and a pair of intersecting parallel cylinder walls having inner wall surfaces that define first and second interconnected cylindrical cavities, the intersecting cylinder walls forming spaced-apart parallel first and second edges;
- first and second shafts extending coaxially in the cavities and supported for rotation at the end walls; and
- first and second rotors secured to said first and second shafts for rotation in the respective cavities, the first and second rotors each having a plurality of radially extending lobes with outer ends, each lobe defining a combustion chamber that opens at the lobe outer end;
- wherein during use, the engine operates through at least six cycles upon one revolution of the rotors, the cycles being ventilation, fuel injection, displacement compounding compression, combustion, expansion, and exhaust.

* * * * *

UNITED STATES PATENT AND TRADEMARK OFFICE
CERTIFICATE OF CORRECTION

PATENT NO. : 6,988,482 B2 Page 1 of 1
APPLICATION NO. : 10/723845
DATED : January 24, 2006
INVENTOR(S) : N. Lockett It is certified that error appears in the above-identified patent and that said Letters Patent is hereby corrected as shown below:

<u>Column 15,</u>
Line 62, "at Least two" should read -- at least two --.

<u>Column 16,</u>
Line 33, "ports Conned in" should read -- ports formed in --.

Signed and Sealed this

Twentieth Day of June, 2006

JON W. DUDAS
*Director of the United States Patent and Trademark Office*